United States Patent [19]

Kaneuchi et al.

[11] Patent Number: 4,928,302

[45] Date of Patent: May 22, 1990

[54] VOICE ACTUATED DIALING APPARATUS

[75] Inventors: Kunihiro Kaneuchi, Yokohama; Seigou Yasuda, Yokosuka; Takashi Ariyoshi, Yokohama; Tomofumi Nakatani, Yokohama; Yutaka Aizawa, Yokohama, all of Japan

[73] Assignee: Ricoh Company, Ltd., Japan

[21] Appl. No.: 265,766

[22] Filed: Nov. 1, 1988

[30] Foreign Application Priority Data

| Nov. 6, 1987 | [JP] | Japan | 62-281833 |
| Nov. 6, 1987 | [JP] | Japan | 62-281832 |
| Nov. 6, 1987 | [JP] | Japan | 62-281831 |
| Nov. 6, 1987 | [JP] | Japan | 62-281830 |
| Dec. 9, 1987 | [JP] | Japan | 62-311397 |
| Dec. 15, 1987 | [JP] | Japan | 62-316942 |
| Jan. 22, 1988 | [JP] | Japan | 63-7355[U] |
| Jan. 22, 1988 | [JP] | Japan | 63-7356[U] |
| Jul. 13, 1988 | [JP] | Japan | 63-174099 |
| Sep. 8, 1988 | [JP] | Japan | 63-224951 |
| Sep. 8, 1988 | [JP] | Japan | 63-224950 |
| Sep. 19, 1988 | [JP] | Japan | 63-233995 |

[51] Int. Cl.⁵ .............................. H04M 1/27
[52] U.S. Cl. ...................... 379/88; 379/354; 379/355; 379/357
[58] Field of Search ............ 379/88, 89, 355, 354, 379/357, 58, 59, 63, 216, 209; 381/42, 43

[56] References Cited

U.S. PATENT DOCUMENTS

| 3,899,645 | 8/1975 | Brofman | 379/355 |
| 4,065,642 | 12/1977 | McClure | 379/77 |
| 4,348,550 | 9/1982 | Pirz et al. | 379/357 |
| 4,644,107 | 2/1987 | Clowes et al. | 379/354 |
| 4,731,811 | 3/1988 | Dubus | 379/58 |
| 4,737,976 | 4/1988 | Borth et al. | 379/58 |
| 4,741,021 | 4/1988 | Kotani et al. | 379/100 |
| 4,748,654 | 5/1988 | Gray | 379/40 |

FOREIGN PATENT DOCUMENTS

| 268739 | 7/1987 | European Pat. Off. . | |
| 0086955 | 5/1985 | Japan | 379/93 |
| 0165152 | 8/1985 | Japan | 379/357 |
| 0235566 | 11/1985 | Japan | 381/42 |
| 61-144157 | 7/1986 | Japan . | |
| 0144157 | 7/1986 | Japan | 379/355 |
| 0053552 | 3/1987 | Japan | 379/355 |
| 0105558 | 5/1987 | Japan | 379/355 |

OTHER PUBLICATIONS

"Isolated and Connected Word Recognition-Theory and Selected Applications", L. Rabiner et al., *IEEE Trans. on Commun.*, vol. COM-29, No. 5, May 1981, pp. 621-659.

Primary Examiner—Thomas W. Brown
Attorney, Agent, or Firm—Mason, Fenwick & Lawrence

[57] ABSTRACT

A voice actuated dialing apparatus has a feature extraction part for extracting a feature of an input data, a storage for storing registered standard patterns and corresponding telephone numbers of destination subscribers, a pattern matching part for comparing a standard pattern of the feature extracted by the feature extracting part with the registered standard patterns so as to recognize a predetermined one of the registered standard patterns which matches the standard pattern of the extracted feature, a speech synthesis part for outputting a speech corresponding to the predetermined standard pattern read out from the storage for confirmation of a result of the recognition, and a dialing circuit for dialing to a predetermined one of the registered telephone numbers corresponding to the predetermined standard pattern in a voice-dialing mode.

11 Claims, 23 Drawing Sheets

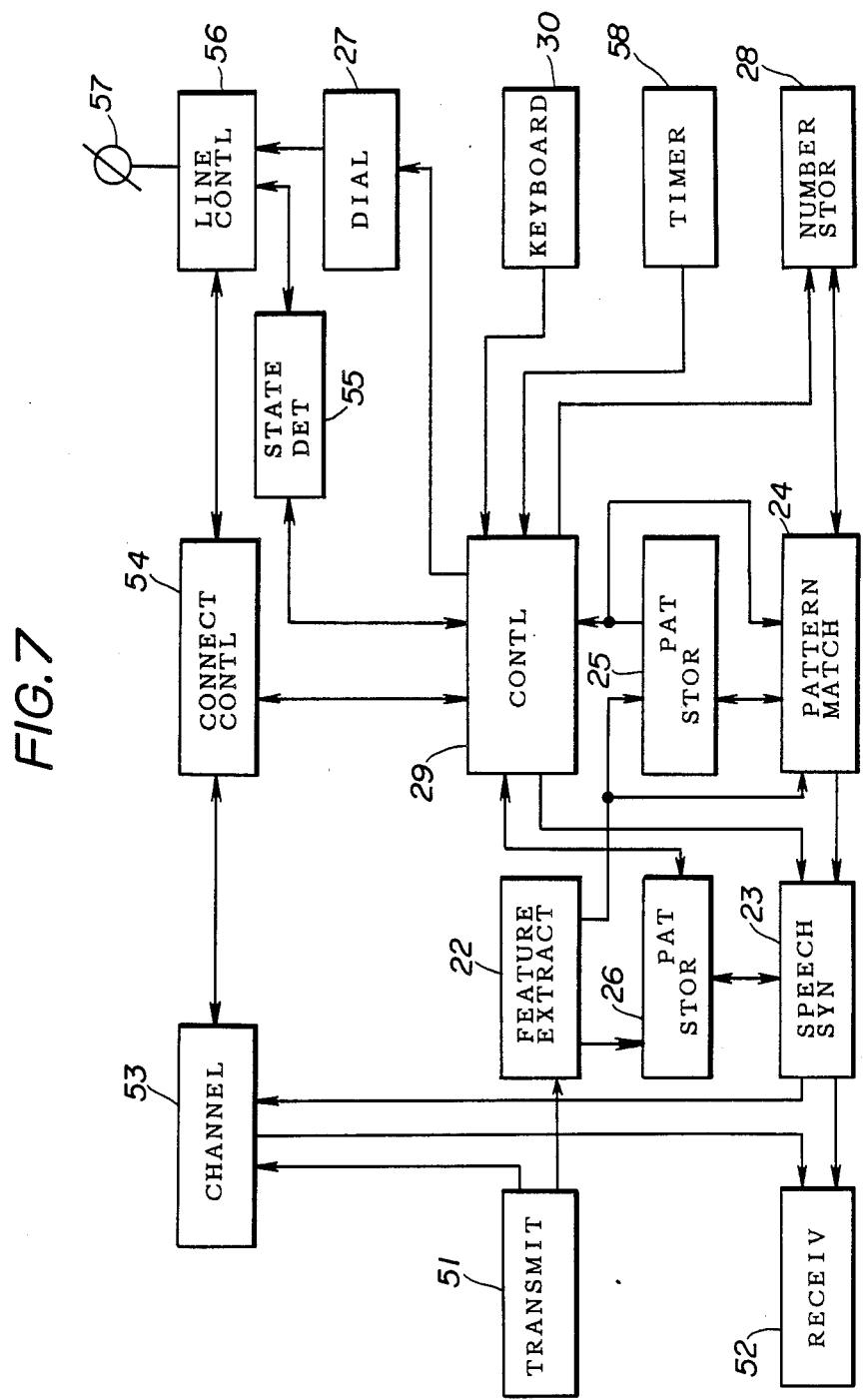

VOICE ACTUATED DIALING APPARATUS

BACKGROUND OF THE INVENTION

The present invention generally relates to voice actuated dialing apparatuses, and more particularly to a voice actuated dialing apparatus which recognizes a voice input and makes an automatic dialing to a registered destination telephone number which corresponds to the voice input.

In a conventional dialing apparatus of a telephone, there is a need to manually dial a telephone number of a destination subscriber when making a telephone call. Hence, a user must remember the telephone number of the destination subscriber or refer to a public or personal telephone directory, and there is a large burden on the user especially when the user frequently makes telephone calls to a large number of subscribers.

Accordingly, a voice actuated dialing apparatus (hereinafter simply referred to as a voice-dialing apparatus) was proposed in a Japanese Laid-Open patent application No. 61-144157. According to this proposed apparatus, the user registers in advance standard patterns for voice recognition and response and corresponding telephone numbers. When making a telephone call, the user speaks a standard pattern (key word) such as a name of the destination subscriber he wishes to call instead of manually dialing the telephone number of the destination subscriber. Then, the apparatus recognizes the standard pattern and automatically dials one of the registered telephone numbers corresponding to the recognized destination subscriber. As a result, there is no need for the user to remember telephone numbers and the user can make a telephone call without referring to the telephone directory.

However, when a large number of telephone numbers are registered, the user may forget the standard patterns for retrieving each of the registered telephone numbers. Furthermore, when the user's voice changes due to catching a cold or the like, there are cases where it becomes impossible to retrieve the desired telephone number because the apparatus cannot recognize the standard pattern from the changed voice. Hence, it is conceivable to successively output the registered standard patterns through speech synthesis and make the user designate the desired standard pattern when it is outputted so that the apparatus can automatically dial a telephone number corresponding to the desired standard pattern. But this conceivable method suffers a problem in that the designation of the desired standard pattern is both troublesome and time consuming. In other words, the user may miss the desired standard pattern when he is interrupted while listening to the successive output of the registered standard patterns, such as when someone talks to the user. In addition, the user may erroneously designate a standard pattern which is outputted prior to the desired standard pattern. In these cases, the user must again listen to the registered standard patterns from the beginning so that he may correctly designate the desired standard pattern.

On the other hand, the voice-dialing apparatus is generally provided with a search function so that the relationship of the registered standard patterns and telephone numbers may be outputted by speech synthesis and/or display. This search function is used when the user forgets the standard pattern for retrieving a telephone number and also when the user forgets whether or not a certain telephone number is already registered. But the search is made by successively outputting the registered standard patterns and telephone numbers by speech synthesis and/or display, and in a worst case, the search must be made to last registered standard pattern and telephone number before the desired standard pattern is found. As a result, there is a problem in that the search takes a long time to carry out. When a clustering is used for the search, it is possible to restrict a search range by entering a cluster number, but the user must remember which standard patterns belong to each of the clusters.

On the other hand, in the conventional voice-dialing apparatus, only one telephone number is registered with respect to one registered standard pattern. Hence, in the case where the destination subscriber has a plurality of telephone numbers but the line is busy when the telephone call is made responsive to the standard pattern corresponding to a first telephone number, the user must once hang up manually and call again later using the same standard pattern or make another call using another standard pattern corresponding to a second telephone number. Thus, when it is only possible to register one telephone number with respect to one registered standard pattern, it is both troublesome and time consuming for the user to find a line which is not busy, especially when the user wishes to use the telephone call on urgent matters and when one or more telephone numbers of the destination subscriber is in use for a long period of time.

But the voice-dialing apparatus can only make the automatic dialing when the destination telephone number is already registered. Thus, the user must register in advance the standard patterns for voice recognition and response and the corresponding telephone numbers. In other words, the user must manually dial a destination telephone number which is not registered, and when the user thereafter wishes to register this telephone number after finishing the call, the user must register the telephone number from the keys and also register the corresponding standard pattern by his voice. The user may register the telephone number and the corresponding standard pattern before calling that telephone number, but the user may be in a hurry and wish to make the call first. Therefore, when the user wishes to call the telephone number which is not registered and thereafter register that telephone number, there is a burden on the user in that the user must dial the same telephone number twice, that is, once to make the call manually and once to register the telephone number.

In addition, when registering the standard patterns for voice recognition and response and the corresponding telephone numbers, an area code of the telephone number for a first region is usually not registered when the voice-dialing apparatus is used in the first region. But when the voice-dialing apparatus is moved to a second region having an area code different from that of the first region, the voice-dialing can no longer be made to the destination subscriber in the first region because the area code of the first region which must be dialed before the destination telephone number is not registered together with the destination telephone number. Similarly, when the voice-dialing apparatus is moved to the second region and the voice-dialing is to be made to the destination subscriber in the second region, the call cannot be made because the area code of the second region which does not need to be dialed when in the second region is registered together with the destination telephone number because the voice-dialing apparatus was originally used in the first region. Therefore, when moving the voice-dialing apparatus from the first region to the second region with the different area code, the user must re-register all of the telephone numbers in the first and second regions so as to add or delete the area codes where necessary.

There are answering phones which record on a magnetic tape or the like a message from a caller when the user is out, and play back the message at an arbitrary time. On the other hand, the voice recognition rate of the voice-dialing apparatus is not 100%, and it is necessary to output the result of the voice recognition by a speech synthesis, for example, so that the user can confirm the destination subscriber before the call is actually made. Recently, there are answering phones provided with a speech synthesis apparatus which records and plays back the message in a form of a digitally encoded audio signal which is unaffected by a deterioration and the like of the magnetic tape. Thus, when applying the voice-dialing apparatus to such an answering phone, it is conceivable to use a speech synthesis apparatus in common for the confirmation of the result of the voice recognition and for the play back of the recorded message.

However, when a part for storing the standard patterns and a part for storing the telephone numbers are provided inside the telephone set, the voice-dialing can only be made from the telephone set to which the standard patterns and the telephone numbers have been registered. In addition, when a part for recording the message is provided inside the answering phone, a total time for recording the messages becomes fixed and it is difficult to cope with the user's needs. In addition, a hardware is required exclusively for setting the telephone set to an answering mode. Furthermore, it is difficult to maintain the telephone set compact when the part for storage is provided inside the telephone set.

Moreover, when the voice-dialing apparatus is applied to the answering phone provided with the speech synthesis apparatus, it is a waste that one speech synthesis apparatus must be provided for the speech recognition and another speech synthesis apparatus must be provided for the answering phone. Further, the answering phone must be manually set to the answering mode by the user when the user goes out, and the functions of the answering phone are not carried out when the user forgets to set the answering phone to the answering mode.

As described before, the line may be busy when the dialing is made. In this case, it is possible to make the voice-dialing later when the destination telephone number is already registered. But it is necessary to manually dial the same telephone number again when this telephone number is not registered. There are ordinary telephones provided with a re-dialing function, wherein a re-dialing is made to a last dialed telephone number responsive to a manipulation of a re-dial button. However, there are problems in that the telephone set must be provided with the re-dial button exclusively for instructing the re-dial operation and the user must still push the re-dial button in order to make the call. In addition, when the user forgets the last dialed telephone number, the user may erroneously re-dial to a wrong telephone number because there is no means for the user to confirm the last dialed telephone number.

Furthermore, as described before, the voice recognition rate of the voice-dialing apparatus is not 100%, and it is necessary to output the result of the voice recognition by a speech synthesis, for example, so that the user can confirm the destination subscriber before the call is actually made. The user may confirm the result of the voice recognition by voice or by pushing a confirm button, for example. Therefore, there is considerable burden on the user in that the user must confirm the destination subscriber with every call made by the voice-dialing.

Next, a description will be given on an example of a conventional voice-dialing apparatus by referring to FIG. 1 so as to explain some of the problems referred above. The voice-dialing apparatus generally has a handset 11, a voice recognition part 12 coupled to the handset 11, and an automatic dialing part 13 for controlling a coupling between the handset 11 and a subscriber line 14. When the user enters by voice a name or a word corresponding to a standard pattern (that is, a key word) of a destination subscriber through the handset 11, the voice recognition part 12 recognizes the standard pattern and selects one of registered telephone numbers corresponding to the recognized standard pattern. The automatic dialing part 13 makes the automatic dialing to the registered telephone number selected by the voice recognition part 12.

In this conventional voice-dialing apparatus, a number of telephone numbers which may be registered is limited. When the telephone numbers are already registered to the full capacity and some new telephone numbers need to be registered, it is necessary to delete a number of registered telephone numbers corresponding to the number of new telephone numbers to be registered. In this case, it is useful to utilize the search function so as to check all of the registered telephone numbers and select those telephone numbers which are unlikely to be used frequently in the future. However, contrary to the user's impression, some of the selected telephone numbers may actually be used frequently, and thus the user may erroneously delete the telephone numbers which are frequently used.

In addition, it is impossible to set the voice recognition rate to 100%. In addition, the user's voice may change with time, and for this reason, the recognition rate tends to gradually deteriorate with time. Accordingly, in actual practice, the voice data which is already registered is renewed or re-registered in order to cope with such deterioration in the voice recognition rate.

However, it is impossible for the user to determine which registered standard pattern has a poor recognition rate. Therefore, there is a problem in that it is extremely difficult for the user to accurately renew or re-register the voice data which actually needs to be renewed or re-registered.

On the other hand, when registering the destination subscribers, the user first enters the telephone number of the destination subscriber from the keys and then enters the standard pattern for identifying the destination subscriber by voice. The entries by the keys and voice may be made in conformance with a guidance (voice or display) provided by the voice-dialing apparatus. But when a large number of destination subscribers are registered at one time, it takes a considerable time to complete the registration. On the other hand, when the registration is carried out in small numbers, it is difficult for the user to keep track of which destination subscribers have been registered and which destination subscribers need to be registered.

SUMMARY OF THE INVENTION

Accordingly, it is a general object of the present invention to provide a novel and useful voice-dialing apparatus in which the problems described above are eliminated.

Another and more specific object of the present invention is to provide a voice-dialing apparatus having means for making a search with respect to registered data within a selected search range. According to the voice-dialing apparatus of the present invention, it is possible to make the search efficiently.

Still another object of the present invention is to provide a voice-dialing apparatus having means for automatically selecting a search range in which a search is to be made with respect to registered data. According to the voice-dialing apparatus of the present invention, it is possible to find a desired registered data with an extremely small burden on the part of the user.

A further object of the present invention is to provide a voice-dialing apparatus having means for registering a plurality of telephone numbers with respect to one destination subscriber. According to the voice-dialing apparatus of the present invention, it is possible to automatically dial a telephone number of a destination subscriber when the line is busy for another telephone number of the same destination subscriber.

Another object of the present invention is to provide a voice-dialing apparatus having means for storing together with the registered data an information related to a frequency of use of each registered telephone number and/or an information related to a recognition rate of each registered key word (that is, name of destination subscriber). According to the voice-dialing apparatus of the present invention, it is possible to edit the registered data most effectively by use of the stored information, where the editing includes deletion, addition and renewal of the registered data.

Still another object of the present invention is to provide a voice-dialing apparatus having means for registering a last dialed telephone number. According to the voice-dialing apparatus of the present invention, it is possible to reduce the burden on the user when registering telephone numbers.

A further object of the present invention is to provide a voice-dialing apparatus having means for extracting registered telephone numbers with or without an area code. According to the voice-dialing apparatus of the present invention, it is possible to adjust the registered data when the voice-dialing apparatus is moved from a first region to a second region which uses an area code different from that of the first region.

Another object of the present invention is to provide a voice-dialing apparatus having means for detecting whether or not a dialed telephone number is already registered. According to the voice-dialing apparatus of the present invention, it is possible to register by a simple operation the dialed telephone number which is not yet registered.

Still another object of the present invention is to provide a voice-dialing apparatus in which a voice output part is used in common for a voice-dialing and an answering phone. According to the voice-dialing apparatus of the present invention, it is possible to realize the answering phone mode in addition to the voice-dialing mode without making the construction of the voice-dialing apparatus complex.

A further object of the present invention is to provide a voice-dialing apparatus which has a detachable external storage. There are two kinds of external storages, a first kind which stores the standard patterns for recognition and response and a second kind which stores messages related to the answering phone mode. According to the voice-dialing apparatus of the present invention, the flexibility of the apparatus is improved because the storage capacity of the first and second kinds of external storages may be selected depending on the needs of the user. Furthermore, the user may make a voice-dialing on an arbitrary voice-dialing apparatus by connecting thereto the first external storage.

Another object of the present invention is to provide a voice-dialing apparatus having means for setting a mode to one of a normal mode in which a voice-dialing can be made and an answering phone mode. According to the voice-dialing apparatus of the present invention, it is possible to effectively utilize a voice output part for both the normal mode and the answering phone mode.

Still another object of the present invention is to provide a voice-dialing apparatus having means for detecting whether or not a detachable external storage for storing standard patterns for recognition and response and corresponding telephone numbers is connected to the voice-dialing apparatus. According to the voice-dialing apparatus of the present invention, it is possible to automatically switch a mode to a normal mode in which the voice-dialing can be made and an answering phone mode depending on whether or not the external storage is connected to the voice-dialing apparatus, and the burden on the user is extremely small in setting the mode of the voice-dialing apparatus.

A further object of the present invention is to provide a voice-dialing apparatus having means for re-dialing to a last dialed telephone number. According to the voice-dialing apparatus of the present invention, it is possible to re-dial the last dialed telephone number by a simple operation and there is no need to re-enter the telephone number by voice.

Another object of the present invention is to provide a voice-dialing apparatus having means for outputting information related to a last dialed telephone number before re-dialing. According to the voice-dialing apparatus of the present invention, it is possible for the user to confirm the destination subscriber to which the re-dialing is made before the actual re-dialing.

Still another object of the present invention is to provide a voice-dialing apparatus having means for prestoring at least a standard pattern of a re-dial instruction. According to the voice-dialing apparatus of the present invention, there is no need for the user to register the standard pattern of the re-dial instruction, and the re-dialing to a last dialed telephone number may be instructed by voice. This means that there is no need to provide a key exclusively for instructing the re-dialing.

A further object of the present invention is to provide a voice-dialing apparatus having means for outputting information related to a telephone number which is to be dialed responsive to a voice instruction for confirmation by the user, and means for automatically dialing to the telephone number when no instruction is received within a predetermined time from a time when the information is outputted. According to the voice-dialing apparatus of the present invention, it is possible to minimize the burden on the user in confirming the recognition result of the voice-dialing apparatus.

Other objects and further features of the present invention will be apparent from the following detailed description when read in conjunction with the accompanying drawings.

BRIEF DESCRIPTION OF THE DRAWINGS

FIG. 7 is a system block diagram showing a third embodiment of the voice-dialing apparatus according to the present invention;

DETAILED DESCRIPTION

Figure 2:
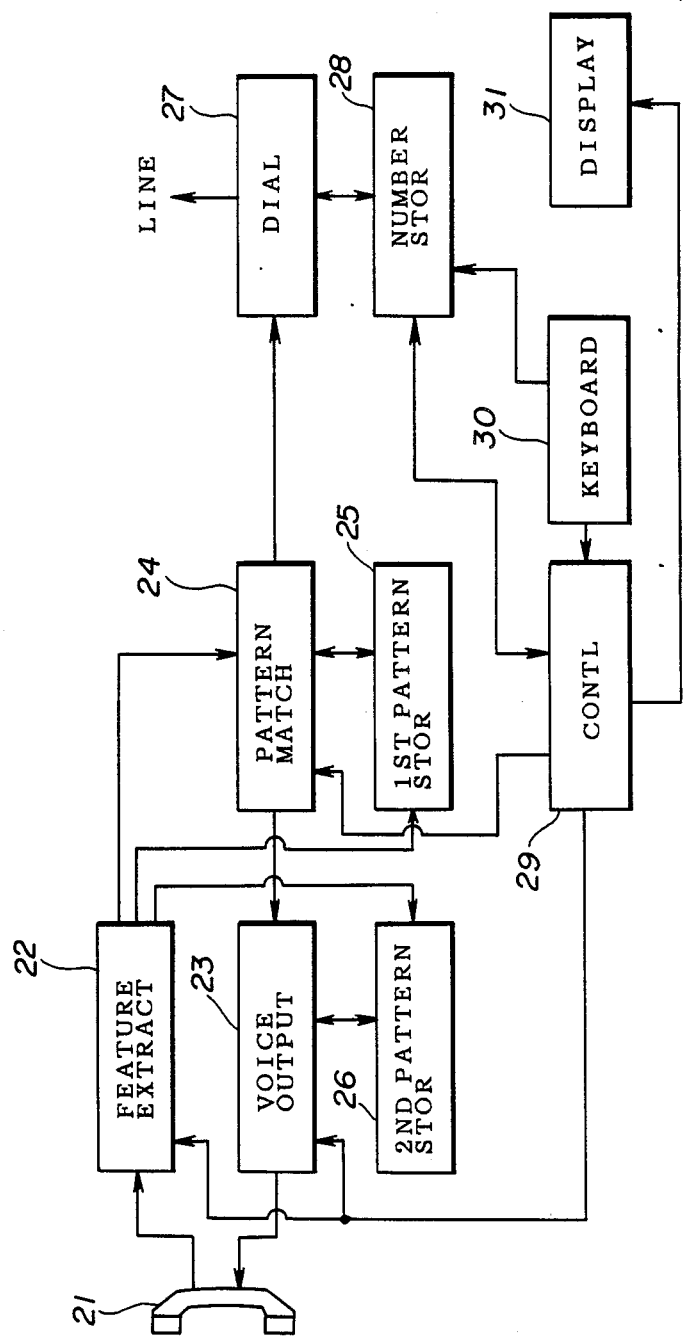
FIG. 2 is a system block diagram showing a first embodiment of a voice-dialing apparatus according to the present invention.

FIG. 2 shows a first embodiment of a voice-dialing apparatus according to the present invention. The voice-dialing apparatus has a handset 21, a feature extraction part 22, a voice output (speech synthesis) part 23, a pattern matching part 24, a first standard pattern storage part 25, a second standard pattern storage part 26, a dial circuit 27, a telephone number storage part 28, a control part 29, a keyboard 30, and a display part 31.

First, the user registers standard patterns (hereinafter referred to as key words) for voice recognition and response and telephone numbers corresponding to the standard patterns. When making the registration, it becomes convenient at the time of a search when the key words and the telephone numbers are grouped because it is then possible to restrict a range of the search to within a group in which a desired registered data belongs. It will be assumed for convenience sake hereunder that the registration is made in groups.

As explained before in conjunction with the description of the conventional voice-dialing apparatus, the user may become unable to retrieve a desired one of the registered data, such as the case where the user forgets the key word of the desired registered data. In this case, the user instructs a search from the keyboard 30, and the control part 29 searches the registered data in response to the search instruction and carries out a control so as to successively output the registered key words in the second standard pattern storage part 26 by voice (speech synthesis) through the voice output part 23. For example, the second standard pattern storage part 26 stores identical key words as the first standard pattern storage part 25. In addition, the control part 29 reads the registered telephone numbers corresponding to each of the outputted registered key words from the telephone number storage part 28 and displays the telephone numbers on the display part 31.

When the user knows the group in which the desired registered data (key word and corresponding telephone number) belongs, the search can be restricted to within the group by designating the group from the keyboard 30, for example. But when the user does not know the group in which the desired registered data belongs, the search is simply made with respect to all of the registered data.

In this embodiment, the search instruction is entered from the keyboard 30, but the search instruction may be made by voice.

The user designates the registered data when the output by voice and display is the desired registered data. When the user makes an erroneous designation, the user instructs by voice or from the keyboard 30 to disregard the designation and output the previous or next registered data. When the previous or next registered data is still not the desired registered data, such an operation of retrieving the previous or next registered data is repeated until the desired registered data is outputted. When the desired registered data is finally outputted, the user instructs the automatic dialing of the telephone number of the desired registered data through the dial circuit 27, that is, the telephone number of the desired destination subscriber. Thus, according to this embodiment, the search for the desired registered data can be made with a satisfactory efficiency.

The voice-dialing apparatus requires the registration of the key words by voice and the automatic dialing to the telephone number of the destination subscriber by the dial circuit 27 is carried out based on a result of a voice recognition in the pattern matching part 24 which recognizes the input voice obtained through the feature extraction part 22 by matching the input voice with the registered key words in the first standard pattern storage part 25. The result of the voice recognition is outputted by voice through the second standard pattern storage part 26 and the voice output part 23 or displayed on the display part 31, so that the user may confirm the result of the voice recognition before the telephone call is actually made.

Figure 3:
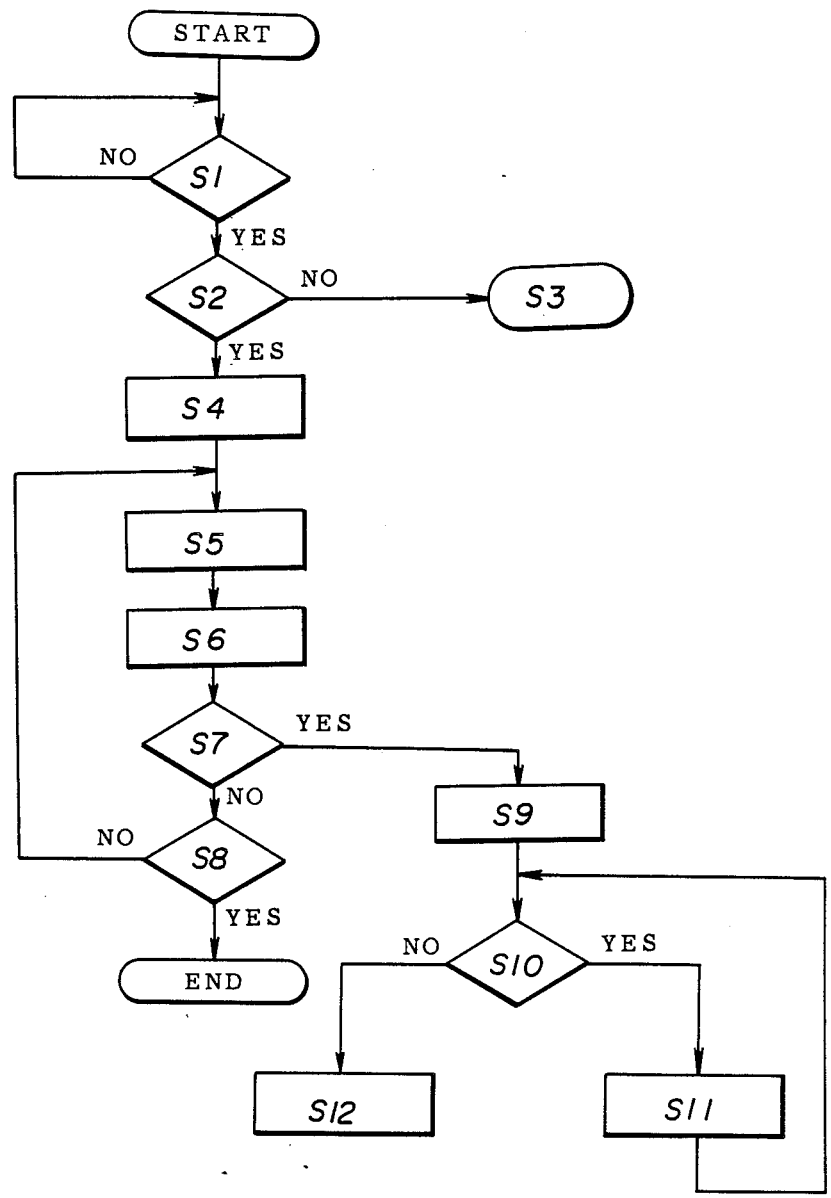
FIG. 3 is a flow chart for explaining an operation of a control part of the first embodiment.

The control part 29 of the first embodiment may be constituted by a microcomputer. FIG. 3 is a flow chart for explaining the operation of the control part 29 of the first embodiment. A step S1 discriminates whether or not an entry is made from the keyboard 30. When the discrimination result in the step S1 becomes YES, a step S2 discriminates whether or not the entry from the keyboard 30 instructs a search mode. The process advances to a step S3 to carry out the instructed operation other than the search when the discrimination result in the step S2 is NO. On the other hand, when the discrimination result in the step S2 is YES, a step S4 enters the data on the group (for example, group number) which is designated from the keyboard 30. A step S5 makes a search within the designated group, and a step S6 outputs by voice and display the data which are found by the search made within the designated group. A step S7 discriminates whether or not one of the outputted data is designated by the user, and a step S8 discriminates whether or not the all of the data within the designated group are outputted when the discrimination result in the step S7 is NO. The process is ended when the discrimination result in the step S8 is YES, but the process returns to the step S5 when the discrimination result in the step S8 is NO.

On the other hand, when the discrimination result in the step S7 is YES, a step S9 outputs the designated data by voice and display. Then, a step S10 discriminates whether or not there is an instruction from the user to retrieve a previous data or a next data. When the discrimination result in the step S10 is YES, a step S11 outputs by voice and display the data prior or next to the data which is first outputted, and the process returns to the step S10. But when the discrimination result in the step S10 is NO, a step S12 carries out on the designated data a process which is instructed by the user.

However, especially when the number of registered data becomes large, the user tends to forget the key words for retrieving the registered data of subscribers which are not called frequently. The search function is useful in such a case. The search may be started by designating a certain registration number from the user in the case where the user generally knows the registration numbers which are assigned to the registered data. For example, the registration numbers are automatically assigned to the registered data by the voice-dialing apparatus in the sequence in which the data are registered. But the search may be made automatically by the voice-dialing apparatus, and in this case, the search is made in the sequence of the registration numbers. But in order to carry out the search with a satisfactory efficiency, that is, complete the search within a short time, it is essential that the user designate the range to which the search is to be restricted. Otherwise, in a worst case, the search must be carried out with respect to all of the registered data until the desired registered data is found, and this is impractical.

Figure 4:
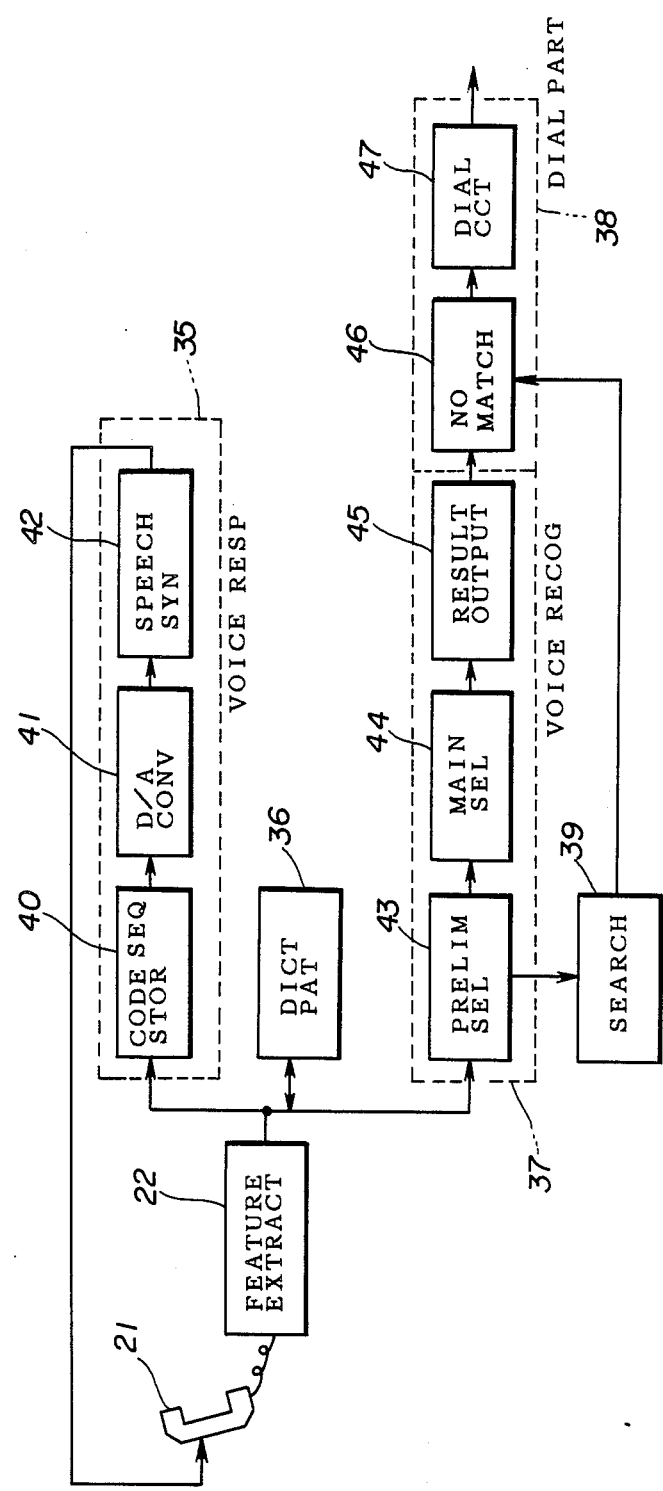
FIG. 4 is a system block diagram showing a second embodiment of the voice-dialing apparatus according to the present invention.

FIG. 4 shows a second embodiment of the voice-dialing apparatus according to the present invention. In FIG. 4, those parts which are essentially the same as those corresponding parts in FIG. 2 are designated by the same reference numerals, and a description thereof will be omitted. This embodiment is designed so that the range of the search is automatically restricted based on an intermediate result which is obtained in a process of requesting confirmation from the user by voice, for example. The voice-dialing apparatus has the handset 21, the feature extraction part 22, a voice response part 35, a dictionary pattern storage 36, a voice recognition part 37, a dial part 38, and a search part 39. The voice response part 35 includes a code sequence storage part 40, a digital-to-analog (D/A) converter 41, and a speech synthesis part 42. The voice recognition part 37 includes a preliminary selection part 43, a main selection part 44, and a result output part 45. The dial part 38 includes a telephone number matching part 46 and a dial circuit 47.

The voice entered from the handset 21 is analyzed into feature quantities in the feature extraction part 22 for recognition and response, and the extracted features are supplied to the voice response part 35 and the voice recognition part 37. The voice response part 35 stores a code sequence of the extracted features in the code sequence storage part 40, and the code sequence is successively converted into an analog signal in the D/A converter 41. The analog signal from the D/A converter 41 is supplied to the speech synthesis part 42 which responds by voice (speech) through the handset 21.

Figure 5:
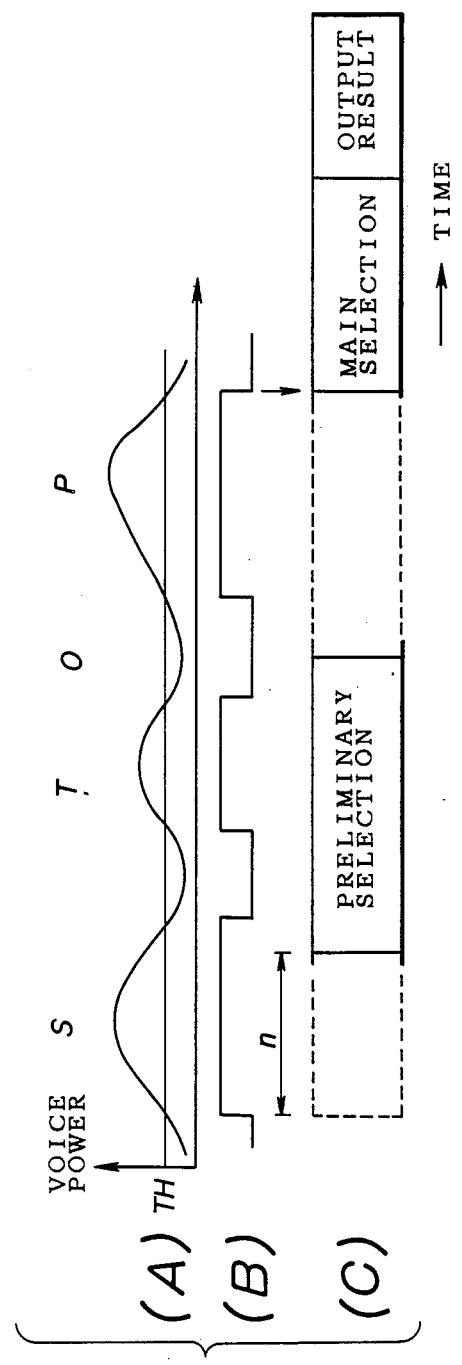
FIG. 5 is a time chart for explaining a preliminary selection and a main selection in the second embodiment.

The voice recognition part 37 has the preliminary selection part 43 which makes a preliminary selection in conformance with a certain recognition method by use of a beginning portion or another portion of the voice data, as shown in FIGS. 5(A) through 5(C). FIG. 5(A) shows the voice power versus time characteristic for the case where the word is "STOP". FIG. 5(B) shows a signal which is obtained by determining a logic level thereof with reference to a predetermined threshold level TH, and FIG. 5(C) shows the sequence of the selection. By making the preliminary selection, it is possible to restrict the candidates of the word to within a predetermined range before the main selection is made in the main selection part 44. Thus, the preliminary selection and the main selection are made and the result of the main selection is outputted from the result output part 45 as shown in FIG. 5(C). Any appropriate method may be employed to match the selections made in the preliminary selection part 43 and the main selection part 44, and there is no restriction on the method to be employed.

When making a search, the voice-dialing apparatus seeks the user's instruction by voice. The search is instructed by the user when the user forgets the key word for retrieving the desired registered data or when the entered key word cannot be recognized for some reason. Hence, when retrieving the registered data on Mr. S. Tanaka, for example, the user may not know whether the key word is "Mr. Tanaka, S." or "Mr. Tanaka, Section Head" and for this reason the user simply enters "Mr. Tanaka, —". When the preliminary selection is made based on this entry "Mr. Tanaka,—", all of the registered data under the name starting with "Mr. Ta—" will be selected. Hence, when these registered data under the similar names starting with "Mr. Ta—" are outputted by voice or displayed in the sequence with the greatest similarity to the name "Mr. Tanaka", the user can find the desired registered data from the restricted registered data selected by the preliminary selection. As a result, the desired registered data can be found with a high efficiency and with considerably less burden on the user when compared to the case where the user must select the desired registered data from all of the registered data.

The preliminary selection part 43 restricts the registered data from which the selection is to be made to approximately ⅓ to 1/5 the total registered data. Accordingly, the main selection part 44 makes the actual selection from the registered data which are automatically restricted to approximately ⅓ to 1/5 the total registered data.

The second embodiment shown in FIG. 4 may have the construction shown in FIG. 2. In this case, the voice response part 35 corresponds to the voice output part 23, and the dictionary pattern storage 36 corresponds to the storages 25, 26 and 28. The voice recognition part 37 corresponds to the pattern matching part 24 and the control part 29, and the dial part 38 corresponds to the dial circuit 27 and the control part 29. The search part 39 corresponds to the control part 29. The telephone number storage 28 may be a part of the telephone number matching part 46. The control part 29 may be constituted by a microcomputer, and FIGS. 6A and 6B are flow charts for explaining the operation of the control part 29 in the case of the second embodiment.

Figure 6B:
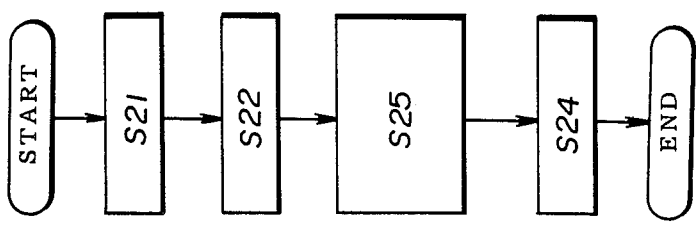
FIGS. 6A and 6B are flow charts for explaining an operation of a control part of the second embodiment.
Figure 6A:
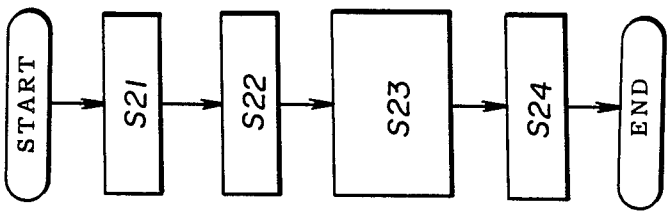

FIG. 6A shows one embodiment of the operation of the control part 29 in the case of the second embodiment. In FIG. 6A, a step S21 reads the key word which is entered by the user, and this key word may be unclear due to a change in the user's voice or the like. A step S22 carries out a preliminary selection to select those registered data having a relatively high probability that they are the registered data of the entered key word. A step S23 successively outputs by voice and display the registered data which are selected by the preliminary selection. Then, a step S24 enters one of the outputted registered data which is designated by the user. It is possible to thereafter advance the process to a step such as the step S9 shown in FIG. 3 described before.

FIG. 6B shows another embodiment of the operation of the control part 29 in the case of the second embodiment. In FIG. 6B, those parts which are the same as those corresponding parts in FIG. 6A are designated by the same reference numerals, and a description thereof will be omitted. In FIG. 6B, a step S25 is carried out in place of the step S23 shown in FIG. 6A. The step S25 successively outputs by voice and display the registered data which are selected by the preliminary selection in a sequence of the greatest similarity to the entered key word.

On the other hand, the voice-dialing apparatus registers only one telephone number with respect to one key word, that is, one destination subscriber. Hence, in the case where the destination subscriber has a plurality of telephone numbers but the line is busy when the telephone call is made responsive to the key word corresponding to a first telephone number, the user must once hang up manually and call again later using the same key word or make another call using another key word corresponding to a second telephone number. Thus, when it is only possible to register one telephone number with respect to one registered key word, it is both troublesome and time consuming for the user to find a line which is not busy, especially when the user wishes to use the telephone call on urgent matters and when one or more telephone numbers of the destination subscriber is in use for a long period of time. Hence, a description will now be given of an embodiment which eliminates these problems.

FIG. 7 shows a third embodiment of the voice-dialing apparatus according to the present invention. In FIG. 7, those parts which are essentially the same as those corresponding parts in FIG. 2 are designated by the same reference numerals. According to this embodiment, it is possible to register a plurality of telephone numbers with respect to one key word, that is, one destination subscriber. Furthermore, when the line is busy for one telephone number of the destination subscriber, the line is automatically disconnected and an automatic dialing is carried out for another telephone number of the same destination subscriber. The operation of automatically disconnecting from the first telephone number of the destination subscriber and automatically dialing a second telephone number of the same destination subscriber may be repeated until the destination subscriber is reached.

In FIG. 7, the voice-dialing apparatus has a transmitter 51, a telephone receiver 52, a channel circuit 53, the feature extracting part 22, the standard pattern storage 26 for speech synthesis, the voice output (speech synthesis) part 23, a connection control part 54, the control part 29, the standard pattern storage 25 for voice recognition, the pattern matching part 24, a state detector 55, the keyboard 30, a timer 58, the number storage part 28, the dial circuit 27, and a line control part 56 coupled to lines 57. The transmitter 51 and the telephone receiver 52 constitute the handset 21.

The feature quantity of the voice entered from the transmitter 51 is extracted in the feature extraction part 22. The control part 29 determines depending on a state of the keyboard 30 whether the extracted feature quantity is to be used as the standard pattern for recognition or the standard pattern for speech synthesis and also whether or not to carry out the pattern matching. When a standard pattern (key word) register button of the keyboard 30 is pushed, the speech synthesis part 23 outputs a registration guidance by voice through the telephone receiver 52. Such a registration guidance is registered in advance so as to guide the user in entering instructions related to the registration of data by voice. Thereafter, the feature of the user's voice is extracted in the feature extraction part 22 and the extracted feature quantity is registered in the standard pattern storage 25 as the standard pattern for recognition and in the standard pattern storage 26 as the standard pattern for speech synthesis. In this state, when there exist a plurality of telephone numbers which are to be registered under the entered key word, the telephone numbers are stored in the telephone number storage part 28 from the keyboard 30 in a sequence of a frequency with which these telephone numbers are used (hereinafter simply referred to as a frequency of use) or in a sequence which is most convenient for the user.

Figure 8:
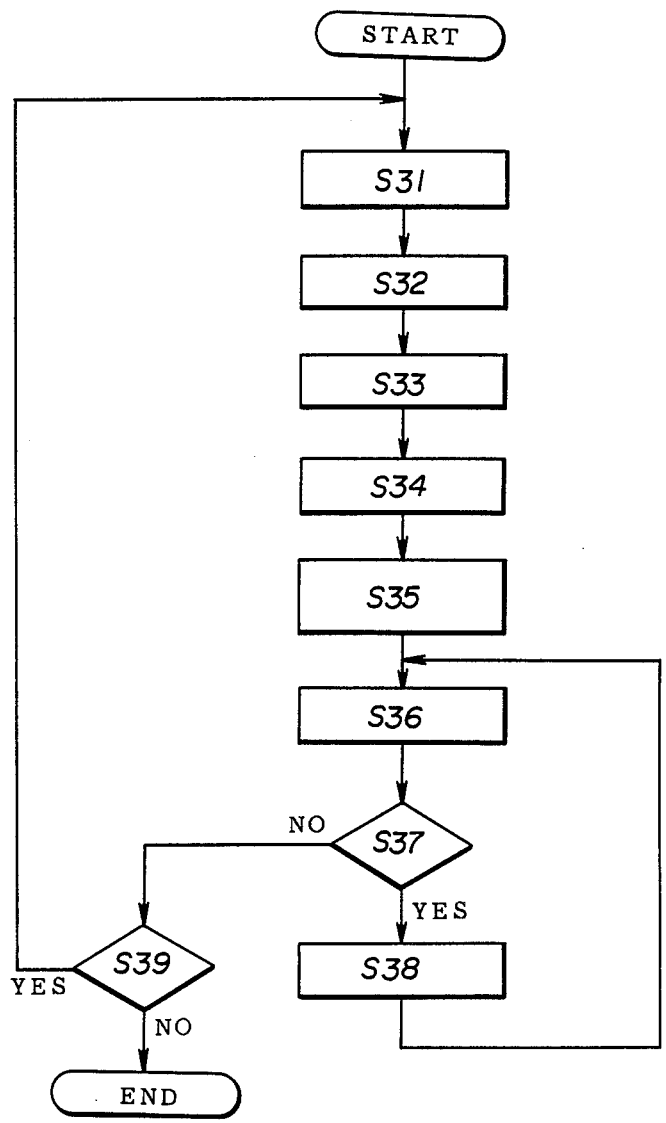
FIG. 8 is a flow chart for explaining an operation of a control part of the third embodiment when registering data.

The control part 29 may be constituted by a microcomputer, and FIG. 8 shows a flow chart for explaining the operation of the control part 29 when registering the data in this third embodiment. A step S31 enters the instruction from the standard pattern (key word) register button. In other words, no instruction is received when the standard pattern register button is not pushed. When the instruction from the standard pattern register key is received, a step S32 outputs a registration guidance requesting the user to enter the telephone number of the destination subscriber. A step S33 enters the telephone number of the destination subscriber entered by the user from the keyboard 30, for example, and a step S34 outputs a registration guidance requesting the user to enter the key word for the destination subscriber. A step S35 enters the key word entered by the user by voice, and a step S36 outputs by voice or display the telephone number which will be registered for confirmation by the user. A step S36 discriminates whether or not there exist a plurality of telephone numbers to be registered under the same destination subscriber (key word). When the discrimination result in the step S37 is YES, a step S38 enters the next telephone number of the same destination subscriber, and the process returns to the step S36. On the other hand, when the discrimination result in the step S37 is NO, a step S39 discriminates whether or not the telephone number of another destination subscriber is to be registered. The process is ended when the discrimination result in the step S39 is NO, but the process returns to the step S31 when the discrimination result in the step S39 is YES.

Next, a description will be given of the operation of the voice-dialing apparatus at the time of a recognition. In a state where the standard pattern (key word) register button of the keyboard 30 is not pushed, a dialing guidance similar to the registration guidance described above is outputted to the user to seek the user's instruction related to the voice-dialing. When the user enters the instruction by voice, the feature of the key word is extracted in the feature extraction part 22. The extracted feature quantity is supplied to the pattern matching part 24 wherein the extracted feature quantity is subjected to a pattern matching with the standard patterns for recognition stored in the standard pattern storage 25. The pattern matching part 24 outputs as the recognition result a feature quantity having a highest similarity to the extracted feature quantity. This recognition result is supplied to the control part 29. When a plurality of telephone numbers are stored in the telephone number storage 28 with respect to the recognition result, the control part 29 automatically reads one of the telephone numbers. For example, the telephone numbers are read out from the telephone number storage 28 in the sequence of the highest frequency of use. The selected telephone number is supplied to the dial circuit 27, and the dialing is automatically made to the desired destination subscriber through the line control part 56. The recognition result from the pattern matching part 24 is also supplied to the speech synthesis part 23 and the corresponding key word is outputted to the user through the telephone receiver 52 so that the user may confirm the desired destination subscriber.

Next, when the first dialed telephone number is detected as being busy in the state detector 55, the dialing is automatically stopped and the line is once disconnected by the line control part 56. The control part 29 then reads out another telephone number from the telephone number storage 28 and supplies the selected telephone number to the dial circuit 27, so as to automatically make the dialing to the desired destination subscriber through the line control part 56. For example, this other telephone number which is read has the second highest frequency of use. Such an operation is repeated until the destination subscriber is reached, unless the user disconnects the line manually. Hence, the telephone numbers registered under the same key word are successively selected in the sequence of the highest frequency of use, for example, until a non-busy line is dialed and the desired destination subscriber is reached. The successive selection of the registered telephone numbers may also be made in the sequence of the largest number, for example. In addition, when a plurality of telephone numbers are registered under the same key word, it is possible to take measures so that the order (or arrangement) of the telephone numbers are automatically rearranged depending on the frequency of use.

Figure 9:
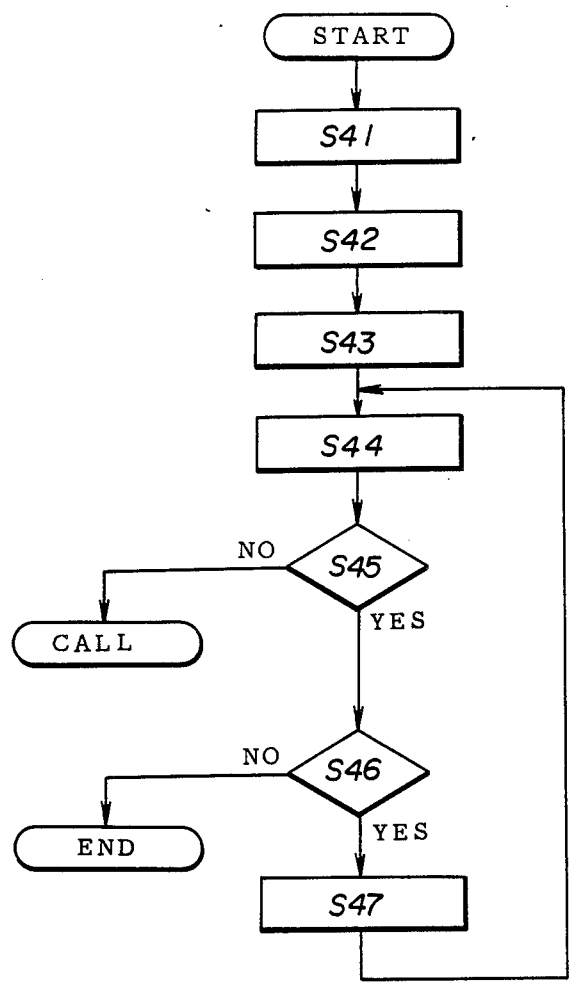
FIG. 9 is a flow chart for explaining an operation of the control part of the third embodiment when making an automatic dialing.

FIG. 9 shows a flow chart for explaining the operation of the control part 29 when making an automatic dialing in this third embodiment. A step S41 outputs a dialing guidance to seek the user's instruction related to the voice-dialing. A step S42 reads the key word entered by the user by voice, and a step S43 outputs the recognized result to the user for confirmation. Here, it is assumed for convenience sake that the recognized result is correct and the user confirms the correct recognition result. Then a step S44 dials the telephone number of the destination subscriber which is recognized from the key word. A step S45 discriminates whether or not the line is busy, and the call is made when the discrimination result in the step S45 is NO. But when the discrimination result in the step S45 is YES, a step S46 discriminates whether or not another telephone number of the same destination subscriber should be dialed automatically. In other words, when the user hangs up manually, the discrimination result in the step S46 is NO. On the other hand, when the user does not hang up, the voice-dialing apparatus automatically enters the sequence of dialing another telephone number of the same destination subscriber. When the discrimination result in the step S46 is YES, a step S47 selects another telephone number registered under the same destination subscriber, and the process returns to the step S44.

According to this embodiment, it is possible for the user to register a plurality of telephone numbers with respect to one destination subscriber. If the line is busy when one of the telephone numbers registered under a key word is automatically selected and dialed, another telephone number registered under the same key word is automatically selected and dialed and such an operation is repeated until the destination subscriber is reached. As a result, even when the line is busy, there is no need for the user to carry out the troublesome operation of hanging up manually to dial the same number again or dial another telephone number of the destination subscriber. Furthermore, the function of automatically selecting the telephone numbers registered under the same key word until a non-busy line is dialed and the desired destination subscriber is reached is especially effective when one or more lines of the destination subscriber is busy and the user needs to reach the destination subscriber in a hurry.

Figure 10:
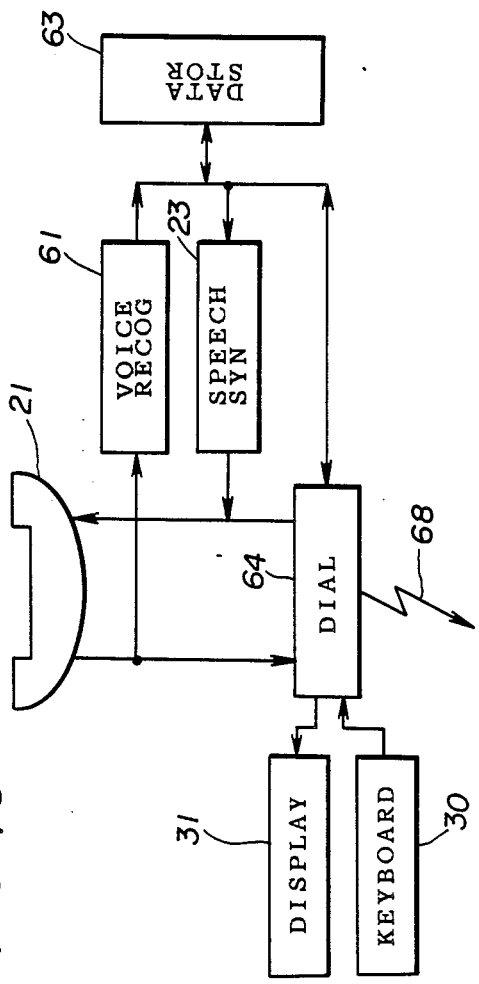
FIG. 10 is a system block diagram showing a fourth embodiment of the voice-dialing apparatus according to the present invention.

FIG. 10 shows a fourth embodiment of the voice-dialing apparatus according to the present invention. In FIG. 10, those parts which are essentially the same as those corresponding parts in FIGS. 2 and 7 are designated by the same reference numerals, and a description thereof will be omitted. The voice-dialing apparatus has a voice recognition part 61, the speech synthesis part 23, a data storage 63, a dialing part 64, the keyboard 30, the display part 31, and the handset 21. The voice recognition part 61 corresponds to the feature extraction part 22 and the pattern matching part 24. The dialing part 64 corresponds to the control part 29 and the dial circuit 27. The data storage 63 corresponds to the storages 25, 26 and 28.

When the user enters the key word for retrieving the registered data on a desired destination subscriber, the key word is recognized and the corresponding registered telephone number is retrieved, and the telephone number of the desired destination subscriber is automatically dialed by the dialing part 64 to connect thereto through a subscriber line 68. In addition, the data on the voice recognition rate and the frequency of use of the dialed telephone number are calculated, and such data are stored in the data storage 63.

The voice recognition part 61 has a voice recognition circuit and carries out operations such as extracting voice data from the voice entered from the handset 21, storing the voice data in the data storage 63, comparing the voice data from the handset 21 and the voice data stored in the data storage 63, and recognizing the destination subscriber which is designated by the voice (key word).

Figure 11:
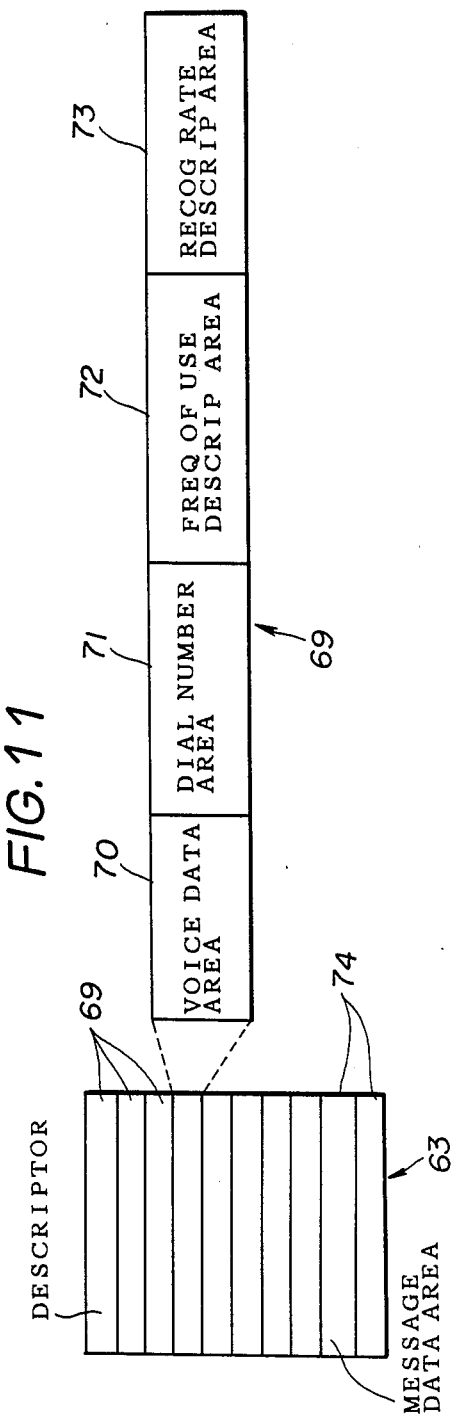
FIG. 11 is a diagram for explaining a structure of a data storage of the fourth embodiment.

As shown in FIG. 11, the data storage 63 has a plurality of descriptors 69 and a message data area 74 in which the voice message data are stored. The descriptor 69 has a voice data area 70 for storing the voice data indicating each destination subscriber, a dial number area 71 in which the telephone numbers of the destination subscriber corresponding to the voice data is stored, a frequency of use descriptive area 72 in which the frequency of use of the telephone number stored in the dial number area 71 is written, and a recognition rate descriptive area 73 in which the recognition rate of the voice data stored in the audio data area 70 is written. The contents of the areas 70 through 73 are rewritten when necessary.

In addition, the speech synthesis part 23 has a speech synthesis circuit and makes access to the message data area 74 of the data storage 63 so as to extract a voice message data based on a control signal from the dialing part 64. The speech synthesis part 23 outputs the message voice through the handset 21 by speech synthesis. When an answerback instruction and a destination subscriber data are supplied from the voice recognition part 61, the speech synthesis part 23 makes access to each descriptor 69 of the data storage 63 so as to extract the voice data based on the destination subscriber data. Hence, the subscriber name (or key word) is outputted through the handset 21 by speech synthesis.

Figure 12:
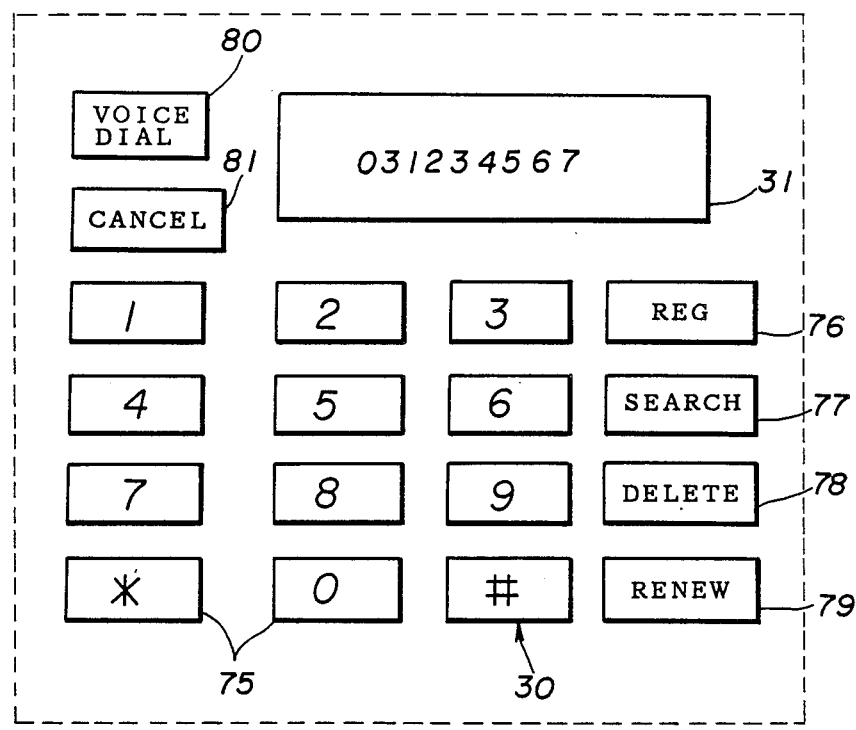
FIG. 12 shows an arrangement of keys of a keyboard of the fourth embodiment together with a display part.
Figure 1:
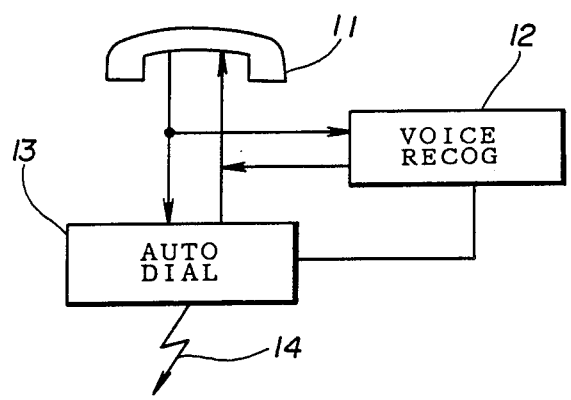
FIG. 1 is a system block diagram generally showing an example of a conventional voice-dialing apparatus.

FIG. 12 shows an arrangement of keys of the keyboard 30 together with the display part 31. The keyboard 30 generally has a ten key 75, a register key 76, a search key 77, a delete key 78, a renew key 79, a voice dial key 80, and a cancel key 81. When one of the keys of the keyboard 30 is pushed, a corresponding key code signal is generated and supplied to the dialing part 64.

The display part 31 is made of a liquid crystal display unit or the like. When a display data is received from the dialing part 64, the display part 31 displays the display data thereon.

The dialing part 64 has a register mode, a recognition mode, a delete mode, a search mode, and a renew mode. The dialing part 64 is set to one of these modes and controls other parts of the voice-dialing apparatus when a corresponding one of the register key 76, the voice dial key 80, the delete key 78, the search key 77, and the renew key 79 is pushed.

In the case where the register mode is selected by pushing the register key 76, the dialing part 64 controls the speech synthesis part 23 so as to output a predetermined guidance by voice through the handset 21. The predetermined guidance requests the user to enter the telephone number of the destination subscriber from the keyboard 30 and to enter the name (key word) of the destination subscriber. Thus, the user makes the requested entry. At the same time, the dialing part 64 selects an empty descriptor 69 in the data storage 63 and stores the telephone number and the voice data on the destination subscriber into this empty descriptor 69. In addition, the frequency of use is set to "0" in the descriptive area 72 of this descriptor 69 and the recognition rate is set to "0" in the descriptive area 73 of this descriptor 69.

On the other hand, when the recognition mode is selected by pushing the voice dial key 80, the dialing part 64 controls the voice recognition part 61 so as to carry out a matching of the name (key word) of the destination subscriber entered from the handset 21 and the voice data registered in the data storage part 63 and recognize the name (key word) entered from the handset 21. Thereafter, the dialing part 64 controls the speech synthesis part 23 to output the recognized name (key word) through the handset 21 by speech synthesis. In other words, an answerback is made so that the user may confirm the result of the recognition.

When the result of the recognition is correct, the user enters a message to confirm by voice through the handset 21 or from the keyboard 30. The dialing part 64 reads out the telephone number corresponding to the recognized name (key word) from the data storage 63 when a confirmation is received from the user, and the dialing part 64 automatically dials to this telephone number thereby connecting the handset 21 to the subscriber line 68. When reading out the telephone number from the data storage 63, the dialing part 64 increments by one the value of the frequency of use stored in the descriptive area 72 of the descriptor 69 in which this telephone number is stored and the value of the recognition rate stored in the descriptive area 73 of the descriptor 69 in which this telephone number is stored.

On the other hand, when the result of the recognition is incorrect and an incorrect answerback is received, the user enters a message to indicate by voice through the handset 21 or from the keyboard 30 that the recognition is incorrect. In this case, the dialing part 64 controls the speech synthesis part 23 so as to again output a guidance requesting the user to enter the name (key word) of the destination subscriber. When the user thereafter enters the name (key word) of the destination subscriber by voice, the dialing part 64 controls the voice recognition part 61 so as to carry out a matching of the name (key word) of the destination subscriber entered from the handset 21 and the voice data registered in the data storage part 63 and recognize the name (key word) entered from the handset 21. Thereafter, the dialing part 64 controls the speech synthesis part 23 to output the recognized name (key word) through the handset 21 by speech synthesis. In other words, an answerback is made so that the user may confirm the result of the recognition.

When the result of the recognition made for the second time is correct, the user enters a message to confirm by voice through the handset 21 or from the keyboard 30. The dialing part 64 reads out the telephone number corresponding to the recognized name (key word) from the data storage 63 when a confirmation is received from the user, and the dialing part 64 automatically dials to this telephone number thereby connecting the handset 21 to the subscriber line 68. When reading out the telephone number from the data storage 63, the dialing part 64 increments by one the value of the frequency of use stored in the descriptive area 72 of the descriptor 69 in which this telephone number is stored, however, the dialing part 64 does not increment the value of the recognition rate stored in the descriptive area 73 of the descriptor 69 in which this telephone number is stored because the name (key word) was not correctly recognized the first time.

Figure 13:
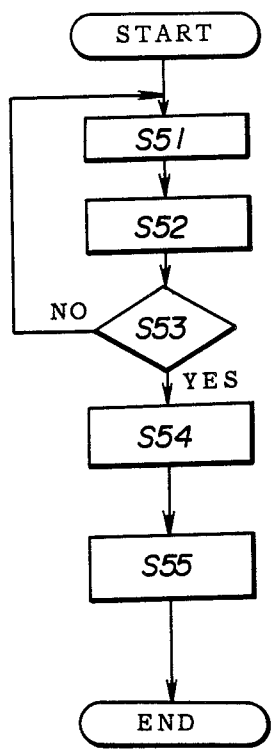
FIG. 13 is a flow chart for explaining an operation of a control part of the fourth embodiment in a recognition mode.

FIG. 13 is a flow chart for explaining an operation of the control part 29 (that is, a part of the dialing part 64) of the fourth embodiment in the recognition mode. A step S51 makes a voice recognition of the voice entry made by the user, and a step S52 outputs the recognized result (key word) for confirmation by the user. A step S53 discriminates whether or not the user confirms the recognized result as being correct. When the recognized result is incorrect and the discrimination result in the step S53 is NO, the process returns to the step S51. On the other hand, when the discrimination result in the step S53 is YES, a step S54 automatically dials the telephone number of the recognized destination subscriber (key word). In addition, a step S55 increments by one the frequency of use of the destination subscriber.

In the case where the delete mode is selected by pushing the delete key 78, the dialing part 64 controls the speech synthesis part 23 so as to output a predetermined guidance by voice confirming whether or not the user wishes to make a search in carrying out the deletion of the registered data. When the user enters a message requesting no search by voice through the handset 21 or from the keyboard 30, the dialing part 64 controls the speech synthesis part 23 so as to output a predetermined guidance requesting the user to enter the name (key word) of the registered destination subscriber which is to be deleted. The dialing part 64 also controls the voice recognition part 61 to recognize the destination subscriber, and the content of the descriptor 69 corresponding to the recognized subscriber is deleted from the data storage 63.

On the other hand, when the user enters a message requesting a search in the delete mode, the dialing part 64 successively reads out the frequency of use stored in the descriptive area 72 of each descriptor 69 in the data storage 63 and sorts (rearranges) the frequency of use in the sequence of the lowest frequency. The dialing part 64 thereafter controls the speech synthesis part 23 to select and output through the handset 21 by speech synthesis the name (key word) of the destination subscriber having the lowest frequency of use. Moreover, this frequency of use is also displayed on the display part 31. When the user pushes the delete key 78 in this state, the dialing part 64 erases the descriptor 69 of the destination subscriber which is selected at that time. On the other hand, when the user pushes a next candidate key (not shown) of the keyboard 30, the dialing part 64 selects and outputs through the handset 21 by speech synthesis the name (key word) of the destination subscriber having the second lowest frequency of use, and this name (key word) is also displayed on the display part 31. The search for the desired registered data which is to be deleted may be carried out similarly thereafter. When the desired deletion is completed and the cancel key 81 is pushed, the dialing part 64 ends the delete mode.

Figure 14:
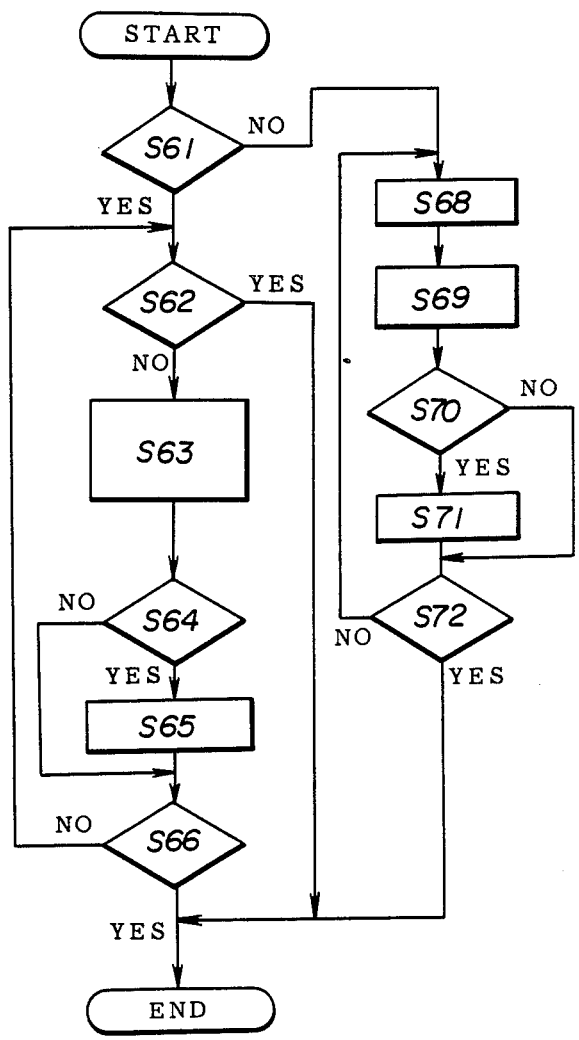
FIG. 14 is a flow chart for explaining an operation of the control part of the fourth embodiment in a delete mode.

FIG. 14 is a flow chart for explaining an operation of the control part 29 (that is, a part of the dialing part 64) of the fourth embodiment in the delete mode. A step S61 discriminates whether or not a search is to be carried out. When the discrimination result in the step S61 is YES, a step S62 discriminates whether or not all of the registered destination subscribers have been outputted. When the discrimination result in the step S62 is NO, a step S63 outputs a destination subscriber (key word) which has not yet been outputted and has the lowest frequency of use among those destination subscribers which have not yet been outputted. A step S64 discriminates whether or not to delete the destination subscriber which is outputted based on an instruction entered by the user. A step S65 deletes the destination subscriber (and the corresponding telephone number) when the discrimination result in the step S64 is YES, and the process advances to a step S66. But when the discrimination result in the step S64 is NO, the process jumps to the step S66. The step S66 discriminates whether or not to end the delete mode. The process returns to the step S62 when the discrimination result in the step S66 is NO. The process is ended when the discrimination result in the step S62 or S66 is YES.

On the other hand, when the discrimination result in the step S68 is NO, a step S68 makes a voice recognition of the voice entry. A step S69 outputs the name (key word) of the recognized destination subscriber, and a step S70 discriminates whether or not the user confirms the recognized result as being correct. When the recognized result is correct and the discrimination result in the step S53 is YES, a step S71 deletes the destination subscriber (and the corresponding telephone number), and the process advances to a step S72. But when the discrimination result in the step S70 is NO, the process jumps to the step S72. The step S72 discriminates whether or not to end the delete mode, and the process returns to the step S68 when the discrimination result in the step S72 is NO. On the other hand, the process is ended when the discrimination result in the step S72 is YES.

A renew mode is selected when the renew key 79 is pushed. In this case, the dialing part 64 controls the speech synthesis part 23 so as to output a predetermined guidance which confirms whether or not the user wishes to make a search for renewing the registered data. When the user enters a message requesting no search by voice through the handset 21 or from the keyboard 30, the dialing part 64 controls the speech synthesis part 23 so as to output a predetermined guidance requesting the user to enter the name (key word) of the registered destination subscriber which is to be renewed. The dialing part 64 also controls the voice recognition part 61 to recognize the destination subscriber, and the content of the voice data area 70 in the descriptor 69 and corresponding to the recognized subscriber is renewed.

On the other hand, when the user enters a message requesting a search in the renew mode, the dialing part 64 successively reads out the frequency of use stored in the descriptive area 72 of each descriptor 69 and the recognition rate stored in the descriptive area 73 of each descriptor 69 in the data storage 63. Furthermore, the dialing part 64 calculates the correct recognition rate for each destination subscriber based on the frequency of use, the recognition rate, and the following formula, where the correct recognition rate is the rate with which the recognition is made correctly.

(Correct Recognition Rate)
=(Recognition Rate)/(Frequency of Use)

The dialing part 64 thereafter sorts the calculated correct recognition rates in the sequence of the lowest value. Then, the dialing part 64 controls the speech synthesis part 23 to select and output through the handset 21 by speech synthesis the name (key word) of the destination subscriber having the lowest correct recognition rate. Moreover, this correct recognition rate is also displayed on the display part 31. When the user pushes the renew key 79 in this state, the dialing part 64 controls the speech synthesis part 23 to output through the handset 21 by speech synthesis a predetermined guidance which requests the user to enter the name (key word) of the destination subscriber which is selected at that time. Hence, the dialing part 64 renews the content of the voice data area 70 of the descriptor 69 of the destination subscriber which is selected at that time.

On the other hand, when the user pushes the next candidate key of the keyboard 30, the dialing part 64 selects and outputs through the handset 21 by speech synthesis the name (key word) of the destination subscriber having the second lowest correct recognition rate, and this name (key word) is also displayed on the display part 31. The search for the desired registered data which is to be renewed may be carried out similarly thereafter. When the desired renewal is completed and the cancel key 81 is pushed, the dialing part 64 ends the renew mode.

Therefore, according to this embodiment, it is possible to automatically extract by use of the search function those destination subscribers having a low frequency of use and those destination subscribers having a low correct recognition rate. Thus, it is possible to accurately carry out the operations of adding destination subscribers and renew voice data of destination subscribers. In addition, since the recognition rate and the frequency of use are displayed when the search is requested in the renew mode, it is possible to discontinue the renewal registration when the frequency of use is low even when the correct recognition rate is small.

Figure 15:
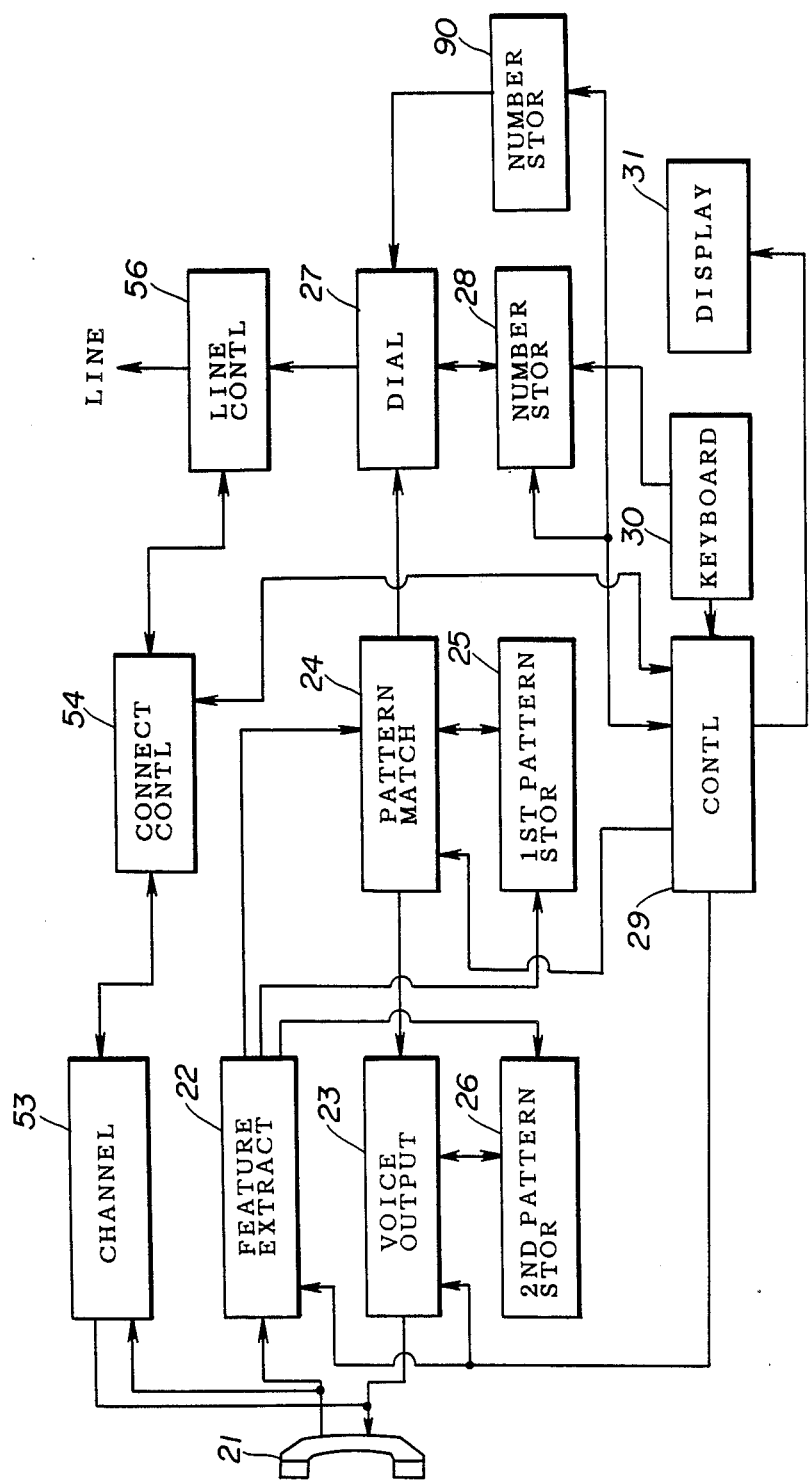
FIG. 15 is a system block diagram showing a fifth embodiment of the voice-dialing apparatus according to the present invention.

Next, a description will be given of a fifth embodiment of the voice-dialing apparatus according to the present invention, by referring to FIG. 15. In FIG. 15, those parts which are essentially the same as those corresponding parts in FIGS. 2 and 7 are designated by the same reference numerals, and a description thereof will be omitted.

First, a description will be given of the operation of the fifth embodiment in the register mode. When making a general registration of the data, the user instructs the registration mode from the keyboard 30. When the control part 29 receives this instruction from the keyboard 31, the control part 29 controls the display part 31 so as to display a message requesting the user to enter the telephone number of the destination subscriber to be registered. This embodiment enters the instruction from the keyboard 30 and displays the message on the display part 31, but it is of course possible to enter the instruction by voice through the handset 21 and also output the message by voice through the handset 21.

The user enters the telephone number of the destination subscriber to be registered in accordance with the message displayed on the display part 31. The entered telephone number is stored in the telephone number storage 28. Thereafter, the control part 29 controls the display part 31 so as to display a message requesting the user to enter by voice the name (key word) of the destination subscriber to be registered. When the user enters the key word by voice through the handset 21, the feature quantity of the key word is extracted in the feature extraction part 22 and the standard pattern for recognition and the standard pattern for response are respectively stored in the standard pattern storages 25 and 26.

Next, a description will be given of the operation of the fifth embodiment in the dialing mode. In the dialing mode, the dial circuit 27 outputs a signal on the line and also outputs the telephone number to a telephone number storage 90. This telephone number storage 90 stores the telephone number which is dialed last. Hence, this last dialed telephone number stored in the telephone number storage 90 may be registered similarly as in the case of the register mode.

In other words, when the user wishes to register the last dialed telephone number, the user instructs the register mode from the keyboard 30. When the control part 29 receives this instruction from the keyboard 31, the control part 29 controls the display part 31 so as to display a message requesting the user to enter the telephone number of the destination subscriber to be registered. In this case, the user instructs the voice-dialing apparatus from the keyboard 30 to read out the last dialed telephone number stored in the telephone number storage 90. The control part 29 reads the last dialed telephone number from the telephone number storage 90, and stores and registers this telephone number in the telephone number storage 28. Thereafter, the key word is entered similarly as in the case of the general register mode described above.

In this embodiment, it is of course possible to omit the telephone number storage 90 and use a portion of the telephone number storage 28 for temporarily storing the last dialed telephone number. If there is no instruction to register the last dialed telephone number, the content of the telephone number storage 90 is erased and rewritten by a telephone number which is dialed.

Figure 16:
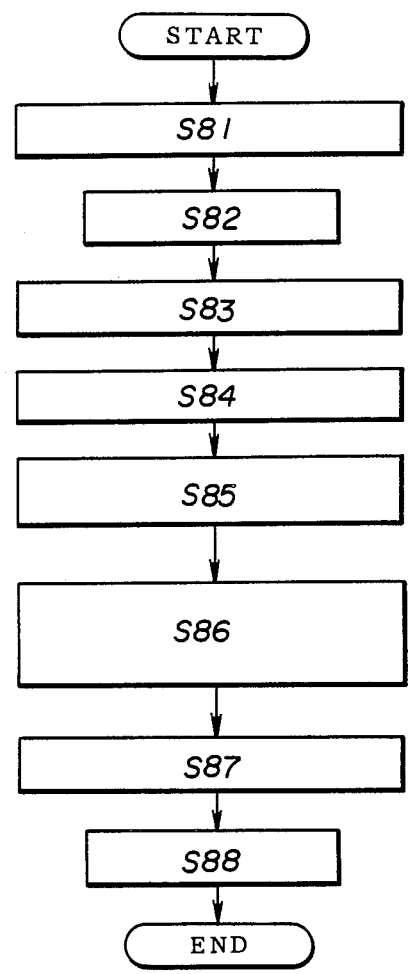
FIG. 16 is a flow chart for explaining an operation of a control part of the fifth embodiment.

FIG. 16 shows a flow chart for explaining the operation of the control part 29 of the fifth embodiment. A step S81 supervises a manual dialing, and a step S82 detects an end of the call. A step S83 detects the instruction from the user to set the mode of the voice-dialing apparatus to the register mode, and a step S84 outputs the message requesting the user to enter the telephone number to be registered. A step S85 detects the instruction from the user to register the last dialed telephone number stored in the telephone number storage 90. A step S85 reads out the last dialed telephone number from the telephone number storage 90 and registers the same in the telephone number storage 28. A step S87 outputs the message requesting the user to enter the name (key word) of the destination subscriber the telephone number of which is now being registered, and a step S88 detects and registers the key word entered by the user.

Figure 17:
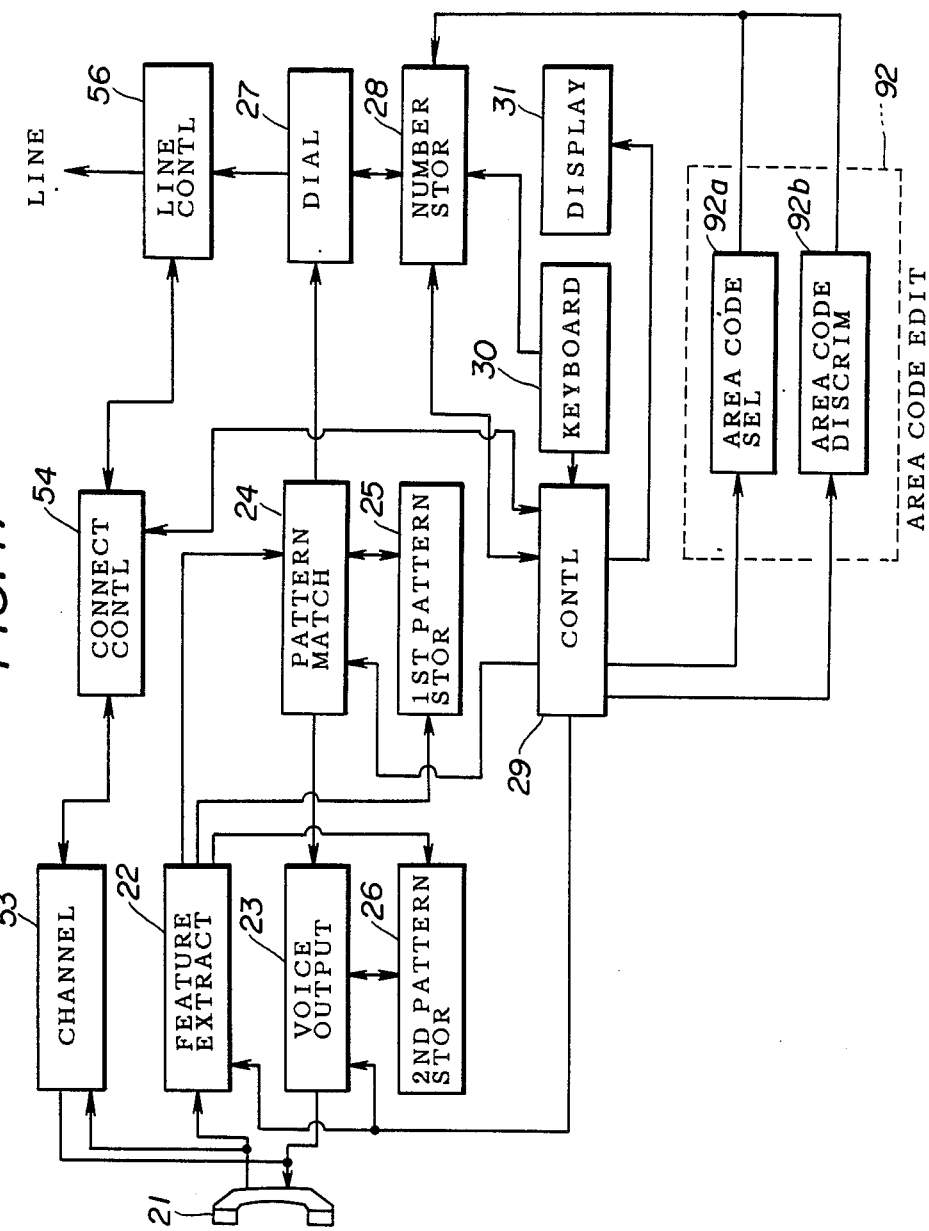
FIG. 17 is a system block diagram showing a sixth embodiment of the voice-dialing apparatus according to the present invention.

Next, a description will be given of a sixth embodiment of the voice-dialing apparatus according to the present invention, by referring to FIG. 17. In FIG. 17, those parts which are essentially the same as those corresponding parts in FIGS. 2 and 7 are designated by the same reference numerals, and a description thereof will be omitted. This embodiment is provided with an area code editing part 92. The area code editing part 92 is shown in FIG. 17 as having an area code selection part 92a and an area code discrimination part 92b, but it is not essential to provide both the parts 92a and 92b. In other words, the area code editing part 92 may be made up of the area code selection part 92a and/or the area code discrimination part 92b.

First, a description will be given of the case where the area code editing part 92 is made up solely of the area code selection part 92a. When an area code is designated by the user, the area code selection part 92a selects the registered telephone numbers which are stored in the telephone number storage 28 and have the designated area code. Hence, it is possible to delete the designated area code from all of the registered telephone numbers selected by the area code selection part 92a.

It is assumed in FIG. 17 that the telephone numbers corresponding to the standard pattern for voice recognition and response are already registered in the telephone number storage 28. For example, when the user moves from a first region (for example, Tokyo) having a first area code (for example, "03") to a second region (for example, Yokohama) having a second area code (for example, "045") and takes the telephone with him, the telephone number of a friend living in the second region is already registered together with the second area code. But when dialing this friend within the second region, there is no need to dial the second area code. Hence, in this case, the user instructs the control part 29 from the keyboard 30 to delete the second area code from all of the registered telephone numbers having the second area code. The control part 29 controls the area code selection part 92a to select those registered telephone numbers which are stored in the telephone number storage 28 and have the second area code. In addition, the control part 29 deletes the second area code from all of the registered telephone numbers selected by the area code selection part 92a and re-registers all of these telephone numbers in the telephone number storage 28 in one operation but without the second area code.

Next, a description will be given of the case where the area code editing part 92 is made up solely of the area code discrimination part 92b. The area code discrimination part 92b discriminates whether or not the telephone numbers registered in the telephone number storage 28 have area codes. By selecting the registered telephone numbers without the area code, it is possible to add a predetermined area code to all of these selected telephone numbers.

When the user moves from the first region to the second region as described above, the telephone number of a friend living in the first region is registered without the first area code. But when dialing this friend from the second region, there is a need to dial the first area code. Hence, in this case, the user instructs the control part 29 from the keyboard 30 to add (or insert) the first area code to all of the registered telephone numbers not having an area code. The control part 29 controls the area code discrimination part 92b to select those registered telephone numbers which are stored in the telephone number storage 28 and do not have the area code. In addition, the control part 29 adds the first area code to all of the registered telephone numbers selected by the area code discrimination part 92b and re-registers all of these telephone numbers in the telephone number storage 28 in one operation but with the first area code added thereto.

When the area code editing part 92 is made up of both the area code selection part 92a and the area code discrimination part 92b, it is evident that it is possible to delete a certain area code from all of the registered telephone numbers having the certain area code and also add an area code to all of the registered telephone numbers not having an area code, both in one operation.

Next, a description will be given of a seventh embodiment of the voice-dialing apparatus according to the present invention, by referring to FIG. 10 since the block system is the same as that of the fourth embodiment described before. In this seventh embodiment, when a telephone number is dialed manually from the keys, a check is made to determine whether or not this telephone number is already registered for enabling the voice-dialing. When it is determined that this telephone number is not yet registered, the name (key word) of the destination subscriber is entered by voice so that the necessary information on this destination subscriber is registered.

As described before in conjunction with FIG. 11, the data storage 63 has the plurality of descriptors 69 and the message data area 74 in which the voice message data are stored. The descriptor 69 has at least the voice data area 70 for storing the voice data indicating each destination subscriber, and the dial number area 71 in which the telephone number of the destination subscriber corresponding to the voice data is stored. The contents of the areas 70 and 71 are rewritten when necessary.

The keyboard 30 has the construction described before in conjunction with FIG. 12.

The dialing part 64 has a main register mode, an auxiliary register mode, the recognition mode, the delete mode, the search mode, and the renew mode. The dialing part 64 is set to one of these modes and controls other parts of the voice-dialing apparatus when a corresponding one of the register key 76, the voice dial key 80, the delete key 78, the search key 77, and the renew key 79 shown in FIG. 12 is pushed.

In the case where the main register mode is selected by pushing the register key 76, the dialing part 64 controls the speech synthesis part 23 so as to output a predetermined guidance by voice through the handset 21. The predetermined guidance requests the user to enter the telephone number of the destination subscriber from the keyboard 30 and to enter the name (key word) of the destination subscriber. Thus, the user makes the requested entry. At the same time, the dialing part 64 selects an empty descriptor 69 in the data storage 63 and stores the telephone number and the voice data on the destination subscriber into this empty descriptor 69.

On the other hand, the auxiliary register mode is selected by pushing the register key 76 in combination with another predetermined key when no key is provided exclusively for selecting the auxiliary register mode or by pushing an auxiliary register key (not shown) when the auxiliary register key is provided exclusively for selecting the auxiliary register mode. In this case, the dialing part 64 (that is, a control part) carries out the process according to a flow chart shown in FIG. 18.

Figure 18:
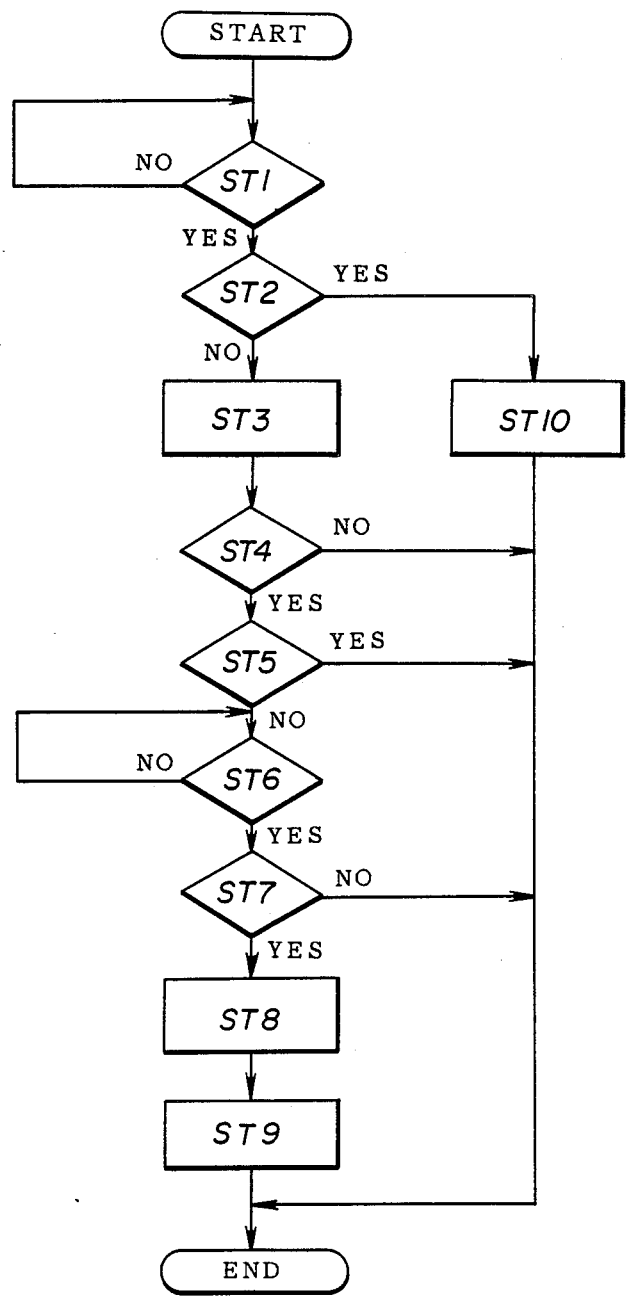
FIG. 18 is a flow chart for explaining an operation of a control part of a seventh embodiment of the voice-dialing apparatus according to the present invention.

In FIG. 18, a step ST1 discriminates whether or not a call is to be started. A step ST2 discriminates whether or not a voice-dialing is to be made when the discrimination result in the step ST1 becomes YES. When the discrimination result in the step ST2 is YES, a step ST10 makes the voice-dialing in response to the key word entered by voice and the process is ended. However, when the discrimination result in the step ST2 is NO and a dialing is to be made manually from the keyboard 30, a step ST3 reads a key code entered from the keyboard 30 and dials a telephone number described by the key code. Then a step ST4 discriminates whether or not an automatic register key (not shown) is pushed. Instead of providing this automatic register key, it is also possible to set the mode to the automatic register mode by pushing the register key 76 in combination with another key. The process is ended when the discrimination result in the step ST4 is NO.

But when the discrimination result in the step ST4 is YES, a step ST5 discriminates whether or not the dialed telephone number is already registered. The process is ended when the discrimination result in the step ST5 is YES. A step ST6 discriminates whether or not the telephone call is ended when the discrimination result in the step ST5 is NO. The end of the telephone call may be detected in various manners such as when the user hangs up, a predetermined time elapses after the user hangs up, and the user picks up the handset 21 after hanging up.

When the discrimination result in the step ST6 becomes YES, a step ST7 discriminates whether or not the name (key word) of the destination subscriber having the telephone number dialed in the step ST3 is to be registered. For example, the dialing part 64 controls the speech synthesis part 23 to output a guidance (or message) saying "Do you wish to register the name of destination subscriber (key word)?". When the user responds "YES" to this message by pushing the register key 76, for example, the discrimination result in the step ST7 becomes YES and the process advances to a step ST8. On the other hand, when the user does not respond even after a predetermined time or when the cancel key 81 is pushed, for example, the discrimination result in the step ST7 becomes NO and the process is ended.

The step ST8 enters the key word entered by voice. For example, the dialing part 64 controls the speech synthesis part 23 to output a guidance saying "please enter name of destination subscriber (key word)", and enters the key word which is entered by the user in response to this guidance. Then, a step ST9 registers the key word (voice data) and the corresponding telephone number. In other words, the dialing part 64 controls the voice recognition part 61 to produce the voice data corresponding to the key word, and then selects an empty descriptor 69 in the data storage 63 and stores the telephone number and the voice data on the destination subscriber into this empty descriptor 69.

The dialing part 64 of the voice-dialing apparatus is set to the recognition mode when the discrimination result in the step ST2 is YES and the process advances to the step ST10. The operations of the voice-dialing apparatus in the recognition mode, the delete mode and the renew mode are basically the same as those of the fourth embodiment described before, and a description thereof will be omitted.

According to this seventh embodiment, a message is outputted to seek the user's instruction on whether or not to register a telephone number when this telephone number is dialed manually from the keyboard 30 and is not yet registered in the data storage 63. Hence, after each telephone call is made by dialing from the keyboard 30, the user simply needs to confirm the need for registration in order to register the telephone number which is not yet registered, and the burden on the user in registering the telephone numbers is considerably reduced compared to the case where all of the telephone numbers to be registered are registered at one time. Furthermore, since the voice-dialing apparatus automatically checks whether or not the manually dialed telephone number is already registered, it is possible to positively prevent the same telephone number from being registered a plurality of times and thus most efficiently utilize the limited storage capacity of the data storage 63.

Figure 19:
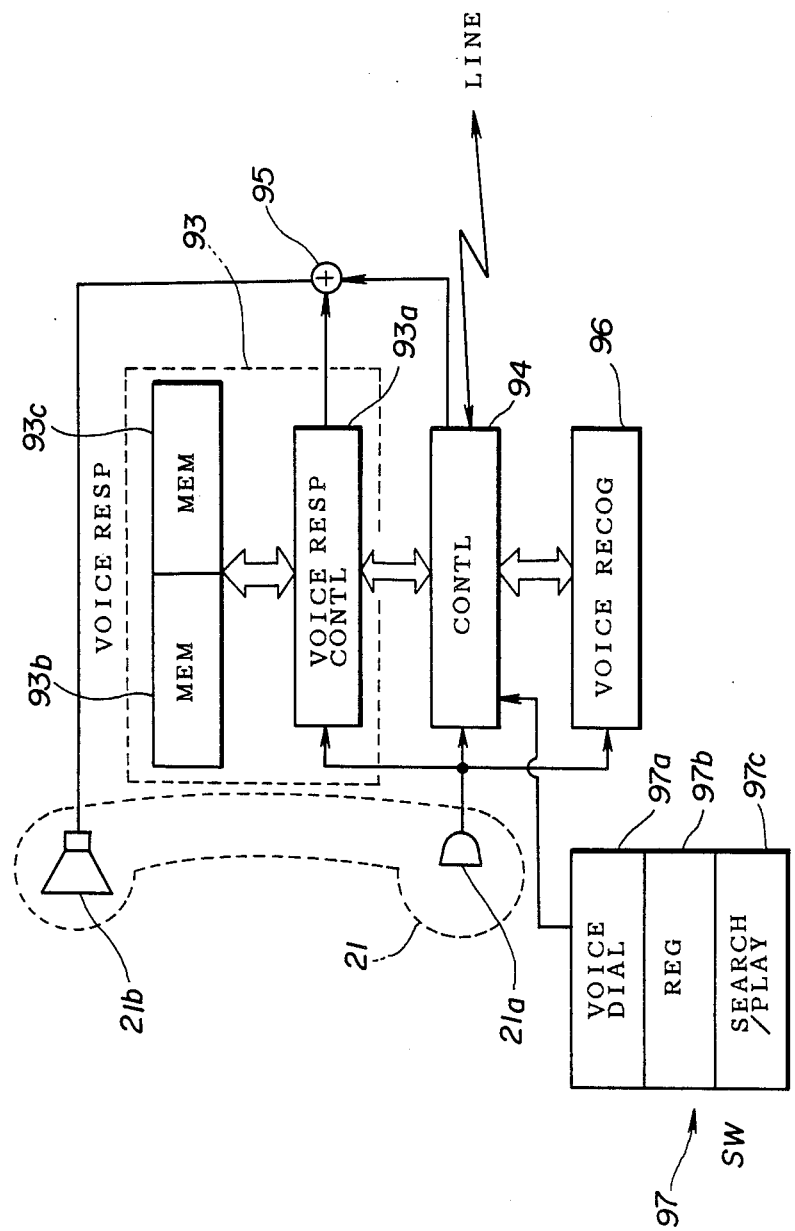
FIG. 19 is a system block diagram showing an eighth embodiment of the voice-dialing apparatus according to the present invention.

Next, a description will be given of an eighth embodiment of the voice-dialing apparatus according to the present invention, by referring to FIG. 19. The voice-dialing apparatus has the handset 21 including a microphone 21a and a speaker 21b, a voice response part 93, a control part 94, an adder 95, a voice recognition part 96, and a switching part 97. The voice response part 93 has a voice response control part 93a, a memory 93b for response, and a memory 93c for answering phone. The switch part 97 has a voice dial switch 97a, a register switch 97b, and a search/playback switch 97c. The handset 21 may be made up of parts other than the microphone 21a and the speaker 21b as long as equivalent functions are obtainable.

The voice response part 93 prestores the voice data for guidance and the names of the destination subscribers in the memory 93b in a digitized form, and the voice data is converted into a corresponding audio signal in the voice response control part 93a based on an instruction from the control part 94 and this audio signal is supplied to the adder 95. The adder adds the audio signal from the response part 93 and the audio signal from the destination subscriber received through the line and the control part 94, and supplies an added signal to the speaker 21b of the handset 21. The control part 94 carries out control such as the control of the dialing, the control of the registration, search, deletion and the like of the telephone numbers and key words for enabling the voice-dialing, and the control of the answering phone. The voice recognition part 96 stores the names (key words) of the destination subscribers in the form of a dictionary, and recognizes the key word of the destination subscriber by comparing the key word entered from the microphone 21a and the registered key words. The result of the recognition is supplied to the control part 94. The voice recognition part 96 may use any kind of recognition methods.

The following Table shows the relationship between the states of the switches 97a through 97c of the switch part 97 and the mode of the voice-dialing apparatus. When making the voice-dialing, the voice dial switch 97a is turned ON and the voice-dialing is made by entering the key word by voice. The registration and search of the telephone number and key word may be made by turning ON the respective switches 97b and 97c of the switch part 97.

TABLE I

| Switch | Mode | | |
|---|---|---|---|
| | Voice Dialing | Answering Phone | Manual Dialing |
| SW 97a | ON | OFF | OFF |
| SW 97b | ON/OFF | ON/OFF | OFF |
| SW 97c | OFF/ON | OFF/ON | OFF |

Next, a description will be given of the operation of this eighth embodiment in the answering phone mode. The answering phone mode is selected by turning OFF the voice dial switch 97a and turning ON the register switch 97b. When a telephone call is received from an arbitrary subscriber, an instruction from the control part 94 is supplied to the voice response part 93 so as to output a guidance for answering phone, and this guidance is transmitted to the arbitrary subscriber through the control part 94 and the line. Then, a signal (for example, a beep) requesting the caller to leave a message is transmitted on the line from the control part 94 and the voice response part 93 assumes a recording mode. In the recording mode, the message of the caller is digitized and stored in the memory 93c. An arbitrary digitizing method may be used, and for example, it is possible to employ a waveform compression system such as the ADPCM. The search/playback switch 97c is turned on when playing back the recorded message. The voice data stored in the memory 93c is supplied to the voice response control part 93a and is converted into an audio signal which is supplied to the speaker 21b through the adder 95.

When making the dialing manually, all of the switches 97a through 97c are turned OFF.

According to this embodiment, the voice response part 93 is used in common for the voice-dialing and for the answering phone, and only the memory 93c is additionally required to realize the answering phone function because the control of the voice-dialing and the control of the answering phone can be carried out by the same control part. The control of the voice response part 93 may be carried out solely by hardware, solely by software, or a combination of hardware and software. In addition, although the switches 97a through 97c are provided, the corresponding instructions may be made by voice by registering such voice instructions in the voice response part 93. By making it possible to enter the instructions from either one of the keyboard or the handset, it becomes easier to cope with the initial registration of data and incorrect recognition made by the voice recognition part 96.

Figure 20:
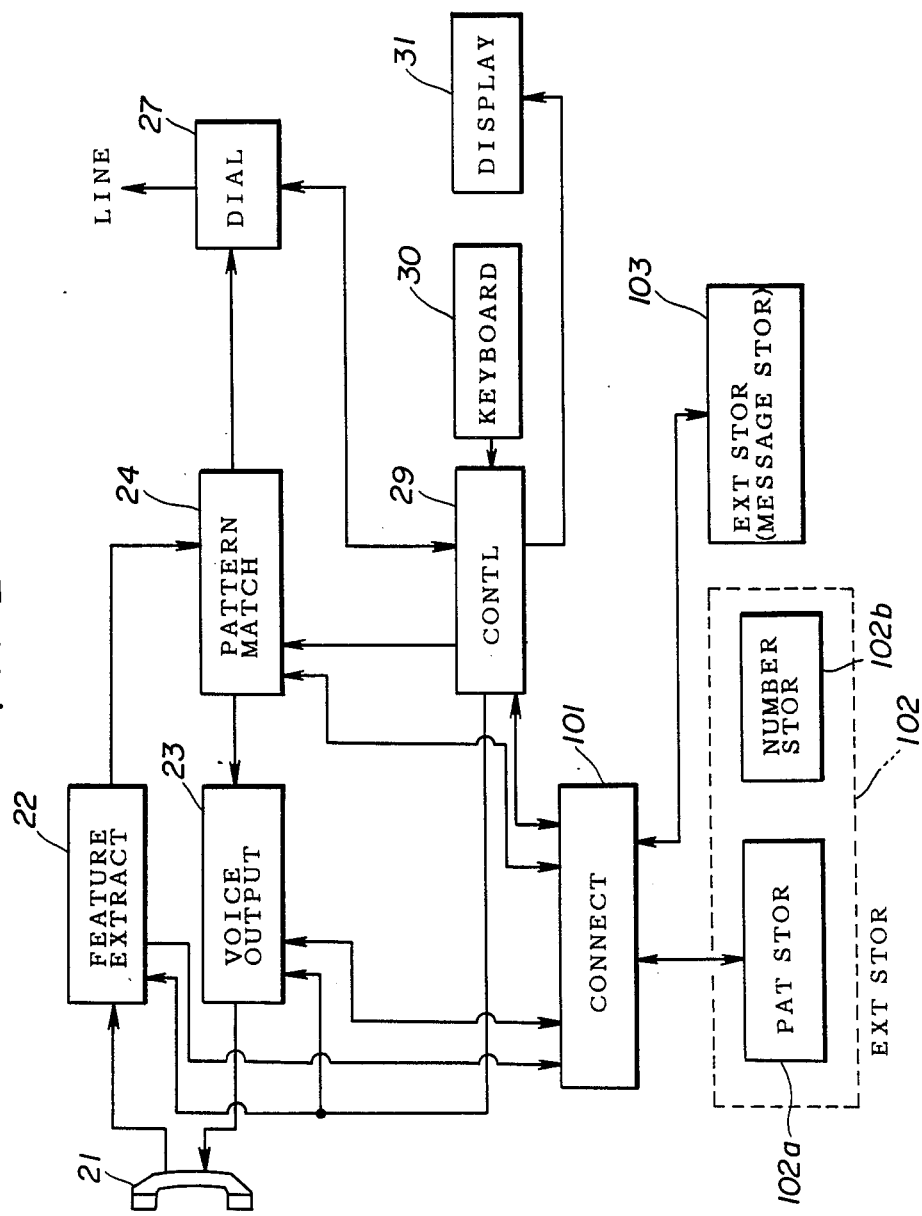
FIG. 20 is a system block diagram showing a ninth embodiment of the voice-dialing apparatus according to the present invention.

Next, a description will be given of a ninth embodiment of the voice-dialing apparatus according to the present invention, by referring to FIG. 20. In FIG. 20, those parts which are essentially the same as those corresponding parts in FIG. 2 are designated by the same reference numerals, and a description thereof will be omitted. In this embodiment, the standard patterns and telephone numbers are stored in a first external storage which is detachable to the voice-dialing apparatus, and the messages of the answering phone are stored in a second external storage which is also detachable to the voice-dialing apparatus. Hence, when the first external storage is attached to the voice-dialing apparatus, it is possible to utilize the voice-dialing by use of the standard patterns and telephone numbers stored therein. On the other hand, when the second external storage is attached to the voice-dialing apparatus, it is possible to utilize the answering phone by use of the messages stored therein.

The voice-dialing apparatus has a connector 101 which functions as an interface, and either one of first and second external storages 102 and 103 can be attached to the voice-dialing apparatus through the connector 101. The first external storage 102 has a standard pattern storage 102a and a telephone number storage 102c, while the second external storage 102 is for storing the messages related to the answering phone. The first and second external storages 102 and 103 respectively store first and second identification codes for identification thereof.

Firstly, in the case where the first external storage 102 is attached to the voice-dialing apparatus through the connector 101, the control part 29 reads the first identification code stored in the first external storage 102 and sets the mode to the voice-dialing mode. The operation of the voice-dialing apparatus in the voice-dialing mode has already been described heretofore, and the description thereof will not be repeated. When compared with the first embodiment, for example, the standard pattern storage 102a corresponds to the storages 25 and 26 and the telephone number storage 102b corresponds to the telephone number storage 28 shown in FIG. 2.

Secondly, in the case where the second external storage 103 is attached to the voice-dialing apparatus through the connector 101, the control part 29 reads the second identification code stored in the second external storage 103 and sets the mode to the answering phone mode. When a telephone call is received from an arbitrary subscriber in this answering phone mode, the control part 29 controls the voice output part 23 to read and output the message registered in the second external storage 103 on the line. After outputting the message, the voice-dialing apparatus waits for a message to be entered by the caller and stores the message from the caller in the second external storage 103 through the feature extraction part 22 which extracts the feature quantity of the message.

Figure 21:
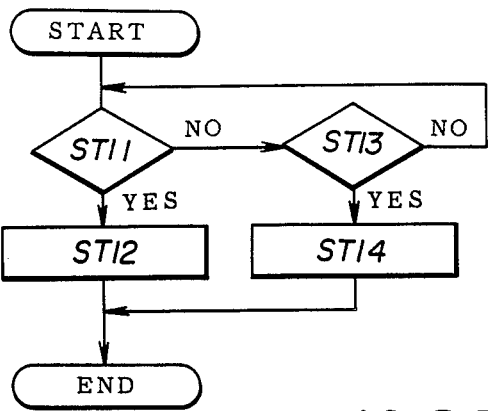
FIG. 21 is a flow chart for explaining an operation of a control part of the ninth embodiment.

FIG. 21 shows a flow chart for explaining the operation of the control part 29 of the ninth embodiment. A step ST11 discriminates whether or not the identification code read from the external storage connected to the connector 101 is the first identification code. When the discrimination result in the step ST11 is YES, a step ST12 sets the mode to the normal mode in which the voice-dialing can be made. On the other hand, when the discrimination result in the step ST11 is NO, a step ST13 discriminates whether or not the identification code read from the external storage connected to the connector 101 is the second identification code. When the discrimination result in the step ST13 is YES, a step ST14 sets the mode to the answering phone mode. The process returns to the step ST11 when the discrimination result in the step ST13 is NO.

According to this embodiment, the burden on the user to switch the mode of the voice-dialing apparatus to the answering phone mode is extremely small since the user simply needs to connect the second external storage 103 to the connector 101. In addition, the storage capacities of the first and second external storages 102 and 103 may be set depending on the needs of the user, and the flexibility of the voice-dialing apparatus is improved compared to the conventional apparatus.

Figure 22:
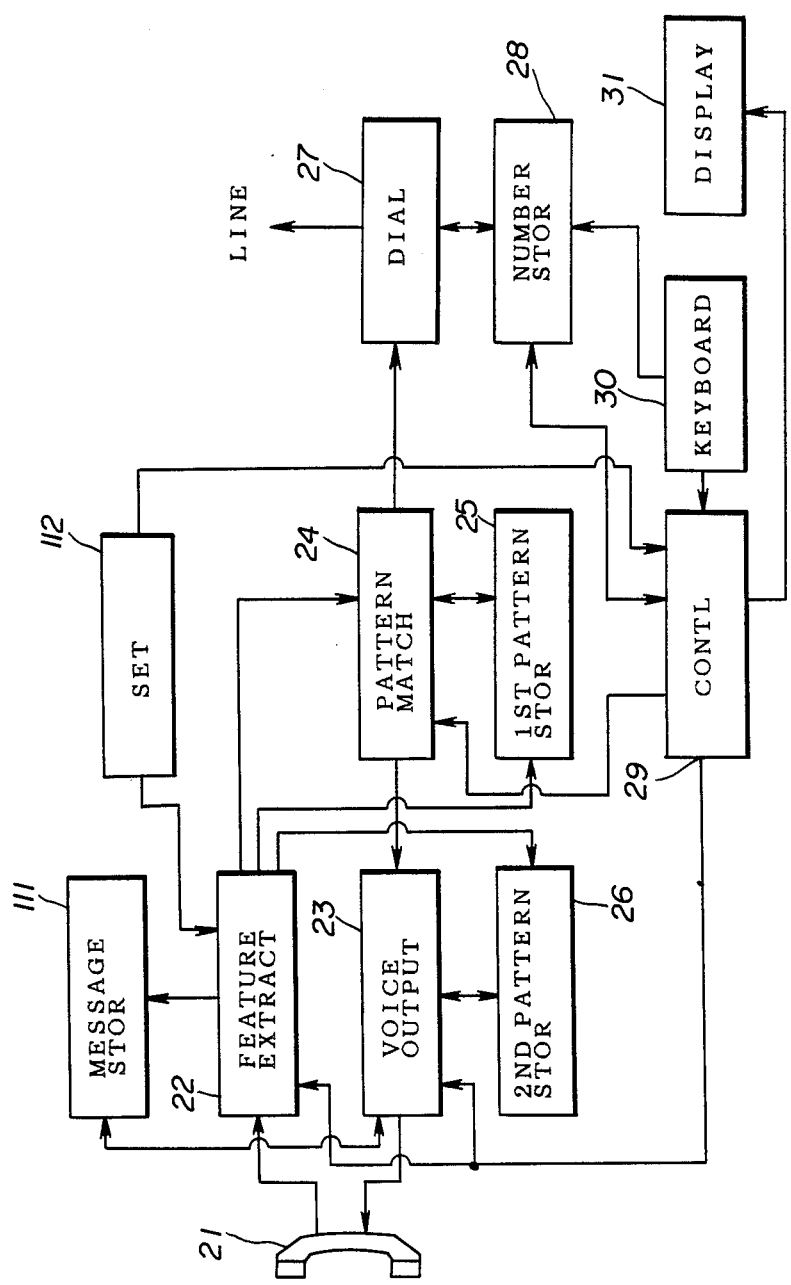
FIG. 22 is a system block diagram showing a tenth embodiment of the voice-dialing apparatus according to the present invention.

Next, a description will be given of a tenth embodiment of the voice-dialing apparatus according to the present invention, by referring to FIG. 22. In FIG. 22, those parts which are essentially the same as those corresponding parts in FIG. 2 are designated by the same reference numerals, and a description thereof will be omitted. In this embodiment, there are provided a message storage 111 for storing the messages related to the answering phone and a set part 112 for setting the mode of the voice-dialing apparatus to a normal mode or the answering phone mode. The feature extraction part 22 and the voice output part 23 which are used in the voice-dialing mode are used in common in the answering phone mode for storing and playing back the messages.

The set part 112 in this embodiment is constituted by a switch which sets the mode to the normal mode in a first position and to the answering phone mode in a second position. When the switch of the set part 112 is in the first position, the mode is set to the normal mode and it is possible to make the voice-dialing. On the other hand, when the switch of the set part 112 is in the second position, the mode is set to the answering phone mode.

Figure 23:
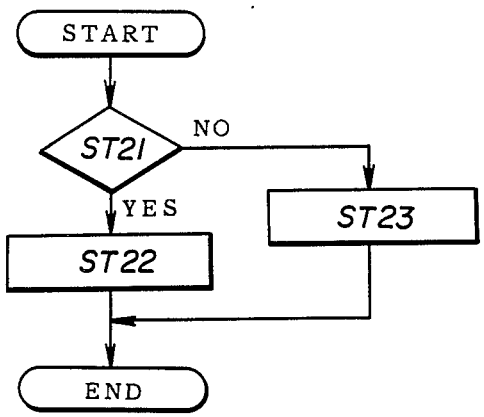
FIG. 23 is a flow chart for explaining an operation of a control part of the tenth embodiment.

FIG. 23 shows a flow chart for explaining the operation of the control part 29 of the tenth embodiment. A step ST21 discriminates whether or not the switch of the setting part 112 is in the first position. When the discrimination result in the step ST21 is YES, a step ST22 sets the mode to the normal mode in which the voice-dialing can be made. But when the discrimination result in the step ST21 is NO, a step ST23 sets the mode to the answering phone mode.

According to this embodiment, the feature extraction part 22 and the voice output part 23 are used efficiently in the normal mode and the answering phone mode, thereby avoiding the construction of the voice-dialing apparatus from becoming complex.

Figure 24:
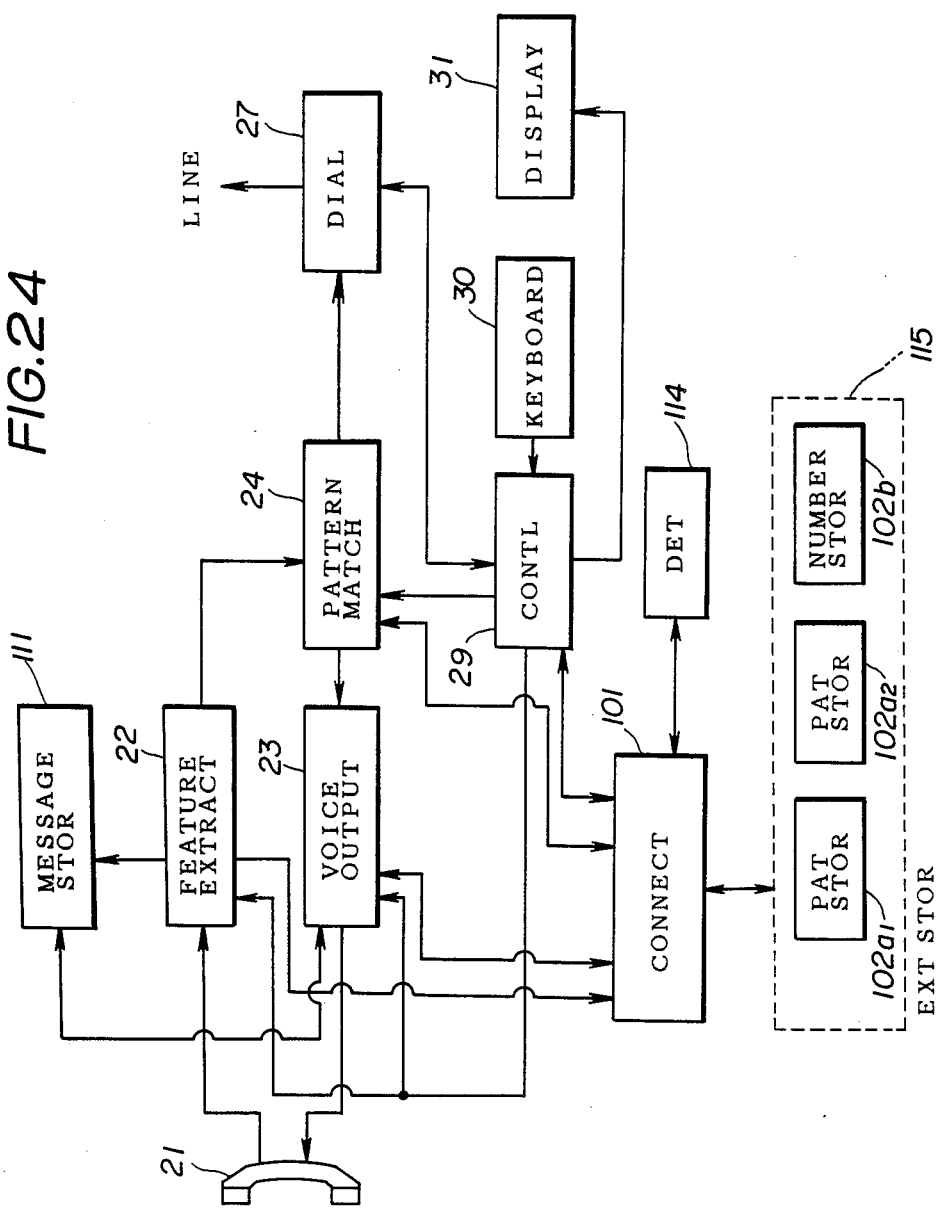
FIG. 24 is a system block diagram showing an eleventh embodiment of the voice-dialing apparatus according to the present invention.

Next, a description will be given of an eleventh embodiment of the voice-dialing apparatus according to the present invention, by referring to FIG. 24. In FIG. 24, those parts which are essentially the same as those corresponding parts in FIGS. 20 and 22 are designated by the same reference numerals, and a description thereof will be omitted. In this embodiment, a detector 114 is provided to detect whether or not a detachable external storage 115 is attached to the connector 101. The external storage 115 has a pattern storage 102a1 for storing standard patterns for recognition, a pattern storage 102a2 for storing standard patterns for response, and the telephone number storage 102b. When the detector 114 detects that the external storage 115 is not attached to the connector 101, the control part 29 automatically sets the mode to the answering phone mode. On the other hand, when the detector 114 detects that the external storage 115 is attached to the connector 101, the control part 29 automatically sets the mode to the normal mode so that the voice-dialing can be made.

When the user wishes to set the mode of the voice-dialing apparatus to the answering phone mode, the user disconnects the external storage 115 from the connector 101. The disconnected external storage 115 may be connected to the connector 101 of another voice-dialing apparatus when the user wishes to utilize the voice-dialing function. When the user disconnects the external storage 115 from the connector 101, the disconnection is detected by the detector 114 and the mode is automatically set to the answering phone mode. Therefore, according to this embodiment, the burden on the user is extremely small when the user wishes to select the answering phone mode.

Figure 25:
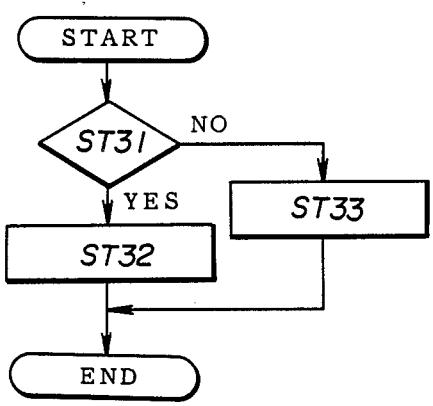
FIG. 25 is a flow chart for explaining an operation of a control part of the eleventh embodiment.

FIG. 25 is a flow chart for explaining the operation of the control part 29 of the eleventh embodiment. A step ST31 discriminates whether or not the detector 114 has detected that the external storage 115 is connected to the connector 101. When the discrimination result in the step ST31 is YES, a step ST32 sets the mode to the normal mode in which the voice-dialing can be made. On the other hand, when the discrimination result in the step ST31 is NO, that is, when the detector 114 has detected that no external storage is connected to the connector 101, a step ST33 sets the mode to the answering phone mode.

Next, a description will be given of a twelfth embodiment of the voice-dialing apparatus according to the present invention. Since the block system of the fifth embodiment may also be used in this embodiment, the description will be given with reference to FIG. 15. In this embodiment, a standard pattern for recognition of a re-dial instruction is registered in the pattern storage 25 in advance. Since the last dialed telephone number is stored in the telephone number storage 90, the user can instruct by voice to re-dial the last dialed telephone number. In other words, when a guidance seeks the user's instruction, the user may instruct by voice and say "re-dial" to instruct the re-dialing of the last dialed telephone number. According to this embodiment, it is possible to re-dial the last dialed telephone number with ease, and there is no need to provide a key exclusively for instructing the re-dialing.

However, according to the twelfth embodiment, there is a need to register the standard pattern of the re-dial instruction in advance. Hence, a description will now be given of a thirteenth embodiment of the voice-dialing apparatus according to the present invention in which the burden on the user may be reduced.

Figure 26:
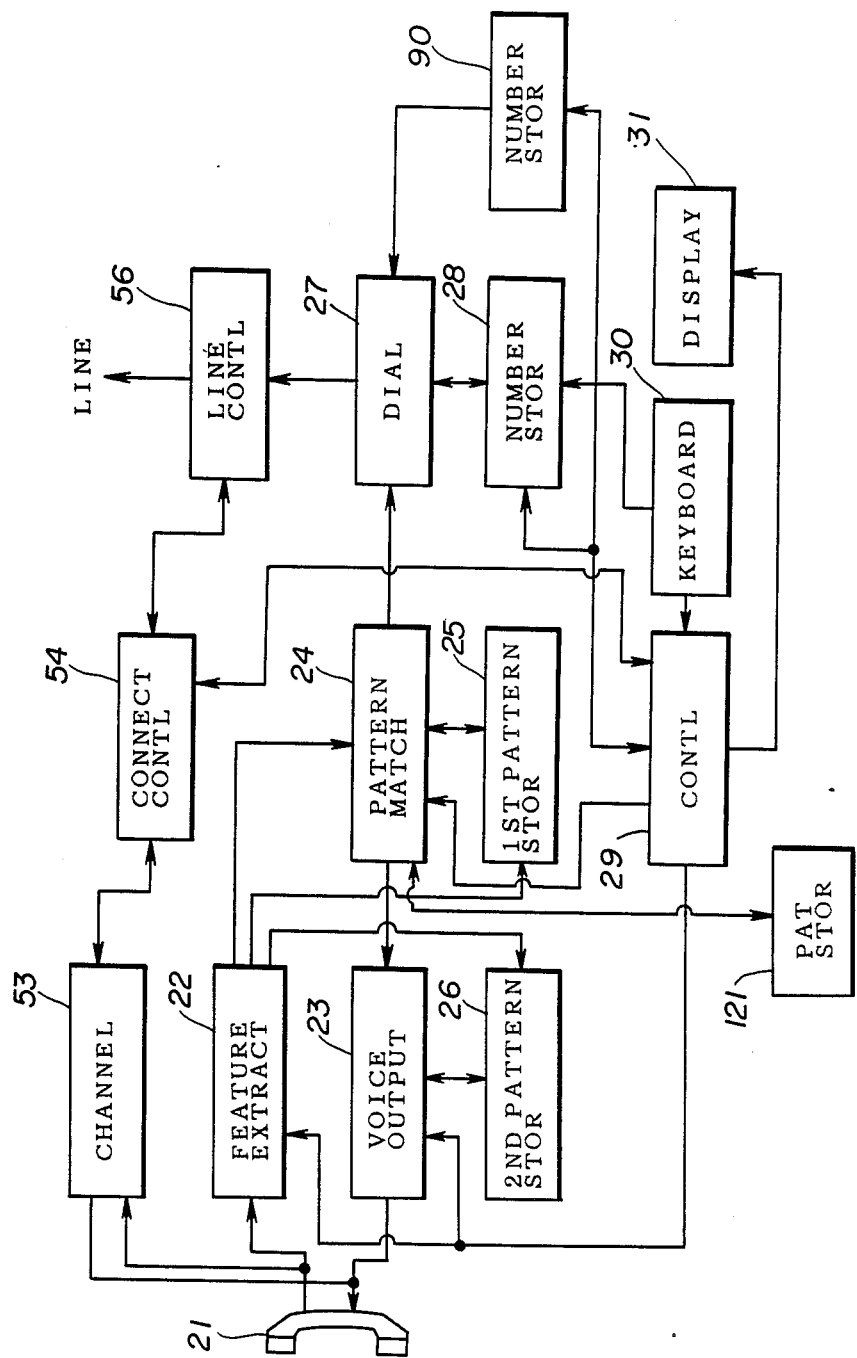
FIG. 26 is a system block diagram showing a thirteenth embodiment of the voice-dialing apparatus according to the present invention.

FIG. 26 shows the thirteenth embodiment of the voice-dialing apparatus according to the present invention. In FIG. 26, those parts which are essentially the same as those corresponding parts in FIG. 15 are designated by the same reference numerals, and a description thereof will be omitted. In this embodiment, a pattern storage 121 prestores the standard pattern of at least one instruction related to the last dialed telephone number stored in the telephone number storage 90. For convenience sake, it is assumed that the standard pattern of "re-dial" is prestored in the pattern storage 121. Hence, in this embodiment, there is no need for the user to register the standard pattern for the instruction "re-dial", and the user can instruct the re-dialing by simply saying "re-dial".

According to the twelfth and thirteenth embodiments, however, the user may mistake the last dialed telephone number. In this case, a telephone number not intended by the user is re-dialed without being confirmed by the user. Thus, a description will now be given of a fourteenth embodiment of the voice-dialing apparatus according to the present invention in which this problem may be eliminated.

Figure 27:
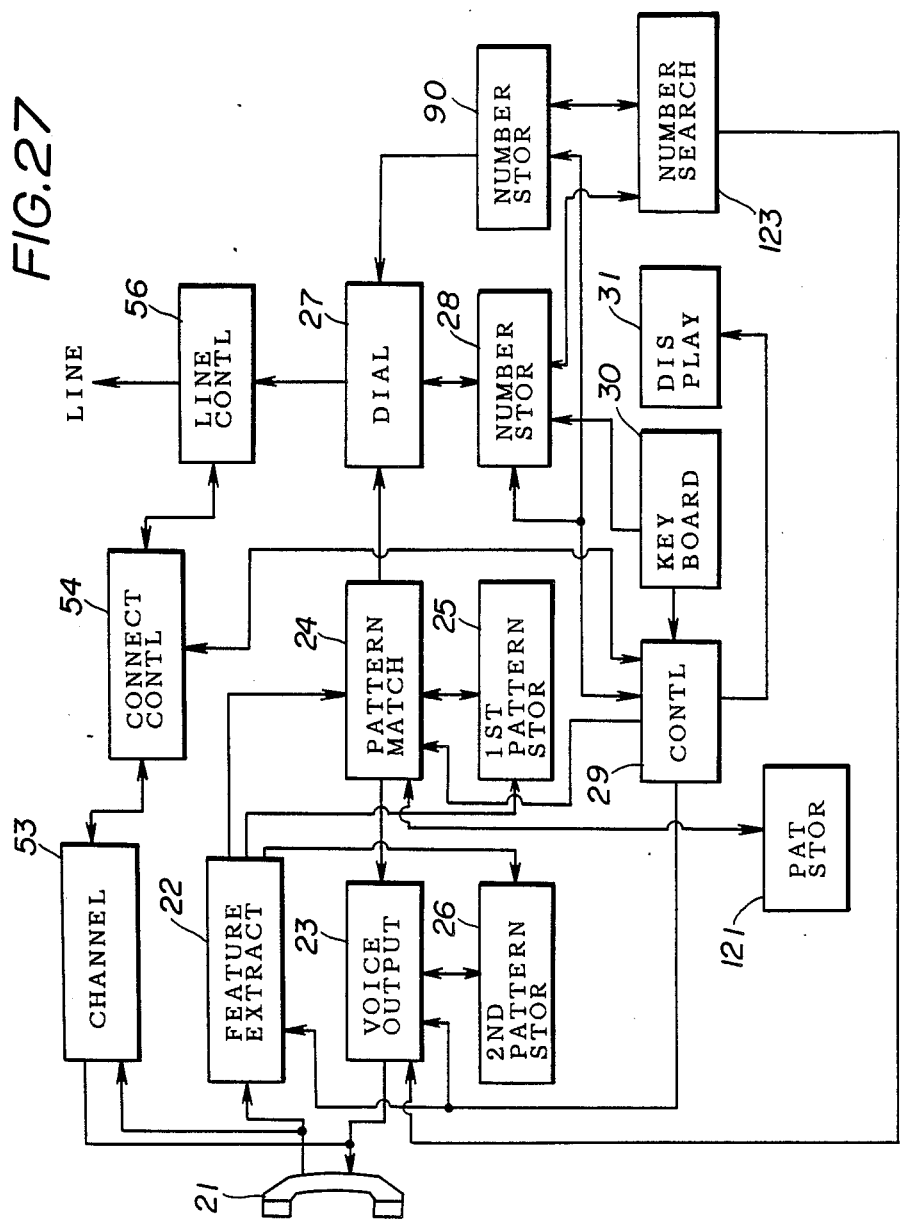
FIG. 27 is a flow chart for explaining a fourteenth embodiment of the voice-dialing apparatus according to the present invention.

FIG. 27 shows a fourteenth embodiment of the voice-dialing apparatus according to the present invention. In FIG. 27, those parts which are the same as those corresponding parts in FIG. 26 are designated by the same reference numerals, and a description thereof will be omitted. In this embodiment, a telephone number search part 123 is provided to search at the time of the re-dialing whether or not the last dialed telephone number stored in the telephone number storage 90 is already registered in the telephone number storage 28. When the telephone number search part 123 detects that the last dialed telephone number is registered in the telephone number storage 28, the corresponding standard pattern for response is read out from the pattern storage 26 and the name (key word) of the destination subscriber having the last dialed telephone number is outputted by voice through the voice output part 23 and the handset 21. Therefore, it is possible for the user to confirm the last dialed telephone number before the re-dialing is actually made.

Although illustration and description of such will be omitted, it is possible to provide only one of the pattern storage part 121 and the telephone number search part 123 depending on the needs of the user.

Figure 28:
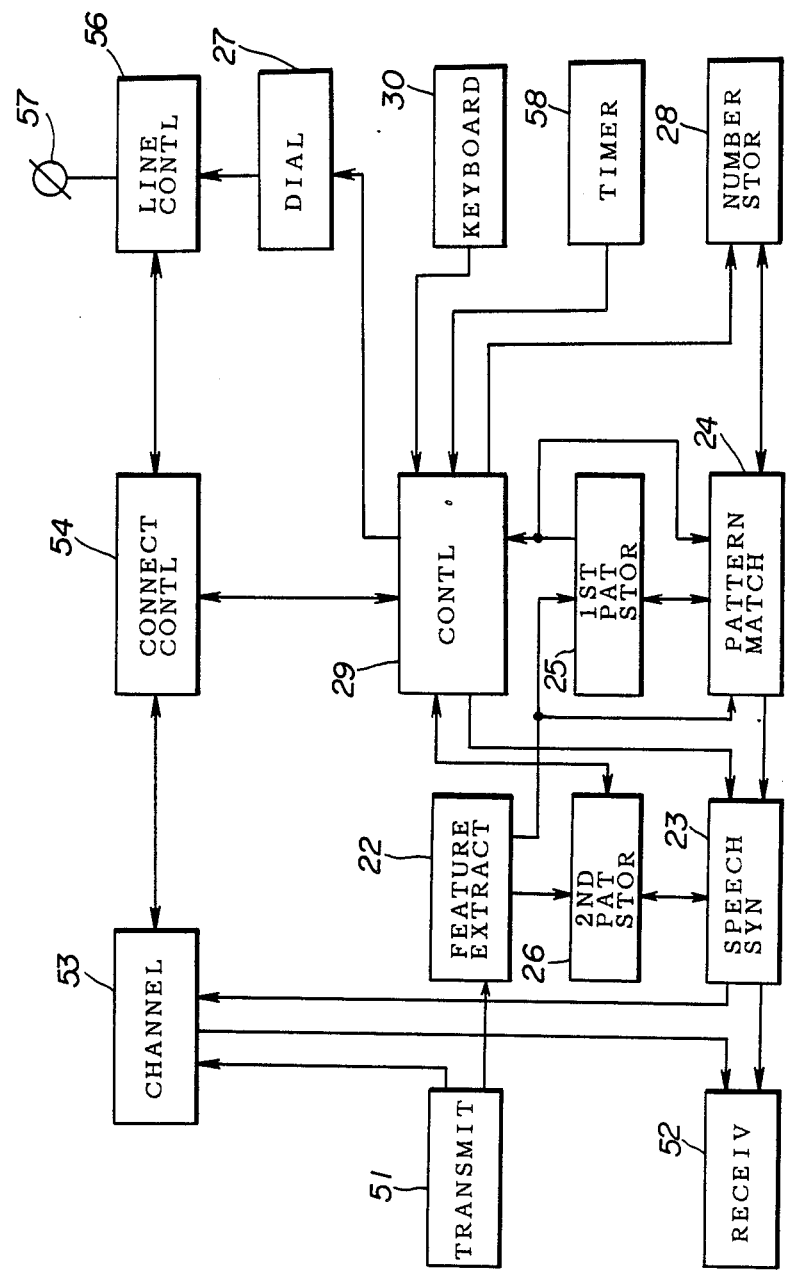
FIG. 28 is a system block diagram showing a fifteenth embodiment of the voice-dialing apparatus according to the present invention.

Next, a description will be given of a fifteenth embodiment of the voice-dialing apparatus according to the present invention, by referring to FIG. 28. In FIG. 28, those parts which are essentially the same as those corresponding parts in FIG. 7 are designated by the same reference numerals, and a description thereof will be omitted. In this embodiment, the timer 58 times a predetermined time when the recognition result is outputted to the user for confirmation when making the voice-dialing. When the user does not enter any instruction during this predetermined time and the timer 58 supplies to the control part 29 a signal indicating that the predetermined time has elapsed, the control part 29 controls the dial circuit 27 so as to automatically start the dialing based on the recognized result. For this reason, there is no need for the user to anything when the recognition result is correct.

On the other hand, when the recognition result is incorrect, the user cancels the voice-dialing from the keyboard 30 or by hanging up, for example, within the predetermined time timed by the timer 58. When the cancel instruction is received, the control part 29 stops the timing operation of the timer 58 and stops the dialing.

In the embodiments described heretofore, various guidances are outputted to guide the user in using the voice-dialing apparatus. However, it is not essential that such guidances are outputted. For example, such guidances may be written on a user's manual.

In addition, the figures for convenience sake illustrate only the essential parts of the embodiments, and those parts which are not illustrated in one figure may be readily understood from another figure. In other words, the figures showing the block systems only illustrate those parts essential to describe the characterizing features of each embodiment.

Further, the present invention is not limited to these embodiments, but various variations and modifications may be made without departing from the scope of the present invention.

What is claimed is:

1. A voice actuated dialing apparatus comprising:
   input/output means for inputting and outputting data;
   feature extraction means for extracting a feature of input data received through said input/output means;
   storage means for storing standard patterns and corresponding telephone numbers of destination subscribers as registered data;
   pattern matching means for comparing a standard pattern of the feature extracted by said feature extraction means with the standard patterns stored in said storage means so as to recognize a predetermined one of the stored standard patterns which matches the standard pattern of the extracted feature;
   speech synthesis means for outputting through said input/output means a speech corresponding to said predetermined stored standard pattern read-out from said storage means so as to confirm a result of the recognition made in said pattern matching means;
   dialing means for dialing of a predetermined one of the telephone numbers stored in said storage means and corresponding to said predetermined standard pattern in a voice-dialing mode; and
   control means for controlling operation sequences of said feature extraction means, said storage means, said pattern matching means, said speech synthesis means and said dialing means;
   said control means successively outputting to said input/output means at least a part of the registered data stored in said storage means in response to a search instruction received from said input/output means designating the part to be successively outputted;
   said pattern matching means having a preliminary selection part and a main selection part, said preliminary selection part in response to the search instruction comparing a certain portion of the standard pattern of the feature extracted by said feature extraction means with corresponding portions of the standard patterns stored in said storage means when the search instruction accompanies a subject of search so as to select specific standard patterns having a certain similarity to said certain portion, said main selection part comparing the standard pattern of the feature extracted by said feature extraction means with only said specific standard patterns so as to recognize the predetermined one of the specific standard patterns which mates the standard pattern of the extracted feature.

2. A voice actuated dialing apparatus as claimed in claim 1 in which said control means successively outputs to said input/output means only the specific standard patterns selected by said preliminary selection part in response to a search instruction received from said input/output means designating a part of the registered data to be successively outputted.

3. A voice actuated dialing apparatus as claimed in claim 2 in which said specific standard patterns are successively outputted to said input/output means in a sequence dependent on a similarity to the standard pattern of the feature extracted by said feature extraction means.

4. A voice actuated dialing apparatus comprising:
   input/output means for inputting and outputting data;
   feature extraction means for extracting a feature of input data received through said input/output means;
   storage means for storing standard patterns and corresponding telephone numbers of destination subscribers as registered data and for storing a last dialed telephone number;
   pattern matching means for comparing a standard pattern of the feature extracted by said feature extraction means with the standard patterns stored in said storage means so as to recognize a predetermined one of the stored standard patterns which matches the standard pattern of the extracted feature;
speech synthesis means for outputting through said input/output means a speech corresponding to said predetermined stored standard pattern read out from said storage means so as to confirm a result of the recognition made in said pattern matching means;
dialing means for dialing of a predetermined one of the telephone numbers stored in said storage means and corresponding to said predetermined standard pattern in a voice-dialing mode; and
control means for controlling operation sequences of said feature extraction means, said storage means, said pattern matching means, said speech synthesis means and said dialing means,
said control means controlling said storage means to store said last dialed telephone number in said storage means as registered data in response to a register instruction received from said input/output means, said register instruction accompanying a standard pattern which corresponds to said last dialed telephone number and is entered from said input/output means through said feature extraction means.

5. A voice actuated dialing apparatus comprising:
input/output means for inputting and outputting data;
feature extraction means for extracting a feature of input data received through said input/output means;
storage means for storing standard patterns and corresponding telephone numbers of destination subscribers as registered data;
pattern matching means for comparing a standard pattern of the feature extracted by said feature extraction means with the standard pattern stored in said storage means so as to recognize a predetermined one of the stored standard patterns which matches the standard pattern of the extracted feature;
speech synthesis means for outputting through said input/output means a speech corresponding to said predetermined stored standard pattern read-out from said storage means so as to confirm a result of the recognition made in said pattern matching means;
dialing means for dialing of a predetermined one of the telephone numbers stored in said storage means and corresponding to said predetermined standard pattern in a voice-dialing mode;
area code editing means for editing an area code of the telephone numbers stored in said storage means; and
control means for controlling operation sequences of said feature extraction means, said storage means, said pattern matching means, said speech synthesis means, said dialing means and said area code editing means;
said control means controlling said area code editing means to delete and/or renew at least an area code of a specific telephone number stored in said storage means in response to an edit instruction received from said input/output means;
said control means controlling said area code editing means to delete the area code from all of the stored telephone numbers having a predetermined area code in response to an edit instruction instructing a deletion of said predetermined area code.

6. A voice actuated dialing apparatus as claimed in claim 5 in which said control means controls said area code editing means to renew the area code of all of the stored telephone numbers having a predetermined area code in response to an edit instruction instructing a renewal of said predetermined area code.

7. A voice actuated dialing apparatus as claimed in claim 5 in which said control means controls said area code editing means to add the area code to all of the stored telephone numbers having no area code in response to an edit instruction instructing a renewal of the telephone numbers having no area code.

8. A voice actuated dialing apparatus comprising:
input/output means for inputting and outputting data;
feature extraction means for extracting a feature of input data received through said input/output means;
storage means for storing standard patterns and corresponding telephone numbers of destination subscribers as registered data and for storing a last dialed telephone number;
pattern matching means for comparing a standard pattern of the feature extracted by said feature extraction means with the standard patterns stored in said storage means so as to recognize a predetermined one of the stored standard patterns which matches the standard pattern of the extracted feature;
speech synthesis means for outputting through said input/output means a speech corresponding to said predetermined stored standard pattern read-out from said storage means so as to confirm a result of the recognition made in said pattern matching means;
dialing means for dialing of a predetermined one of the telephone numbers stored in said storage means and corresponding to said predetermined standard pattern in a voicedialing mode;
control means for controlling operation sequences of said feature extraction means, said storage means, said pattern matching means, said speech synthesis means and said dialing means;
said control means having means for detecting whether or not said last dialed telephone number is already stored in said storage means as registered data;
said control means controlling said storage means to store said last dialed telephone number in said storage means as registered data in response to a register instruction received from said input/output means only when said last dialed telephone number is not stored in said storage means as registered data as a result of the detection, said register instruction accompanying a standard pattern which corresponds to said last dialed telephone number and is entered from said input/output means through said feature extraction means.

9. A voice actuated dialing apparatus as claimed in claim 8 in which said control means has means for outputting a guidance to said input/output means to seek a register instruction which instructs said control means to register said last dialed telephone number as registered data only when said last dialed telephone number is not stored in said storage means as registered data as a result of the detection.

10. A voice actuated dialing apparatus comprising:
input/output means for inputting and outputting data;

feature extraction means for extracting a feature of input data received through said input/output means;

storage means for storing standard patterns and corresponding telephone numbers of destination subscribers as registered data and for storing a last dialed telephone number;

pattern matching means for comparing a standard pattern of the feature extracted by said feature extraction means with the standard patterns stored in said storage means so as to recognize a predetermined one of the stored standard patterns which matches the standard pattern of the extracted feature;

speech synthesis means for outputting through said input/output means a speech corresponding to said predetermined stored standard pattern read-out from said storage means so as to confirm a result of the recognition made in said pattern matching means;

dialing means for dialing of a predetermined one of the telephone numbers stored in said storage means and corresponding to said predetermined standard pattern in a voice-dialing mode; and control means for controlling operation sequences of said feature extraction means, said storage means, said pattern matching means, said speech synthesis means and said dialing means;

said control means controlling said dialing means to redial said last dialed telephone number stored in said storage means in response to a redial instruction;

said control means having means for detecting whether or not a standard pattern of said last dialed telephone number is stored in said storage means, said control means outputting the standard pattern of said last dialed telephone number to said input/output means so as to control said dialing means to dial said predetermined telephone number only when a confirmation is received from said input/output means.

11. A voice actuated dialing apparatus as claimed in claim 10 in which said input/output means has a handset, a keyboard and a display part, and said control means outputs the standard pattern of said last dialed telephone number to at least said handset.

* * * * *